US006841130B2

(12) United States Patent
Lehtinen et al.

(10) Patent No.: US 6,841,130 B2
(45) Date of Patent: Jan. 11, 2005

(54) PIPETTING METHOD AND MULTICHANNEL PIPETTING APPARATUS

(75) Inventors: Kauko Lehtinen, Raisio (FI); Jari Suontausta, Raisio (FI)

(73) Assignee: Wallac Oy, Turku (FI)

( * ) Notice: Subject to any disclaimer, the term of this patent is extended or adjusted under 35 U.S.C. 154(b) by 414 days.

(21) Appl. No.: 10/016,680

(22) Filed: Dec. 17, 2001

(65) Prior Publication Data

US 2002/0086440 A1 Jul. 4, 2002

(30) Foreign Application Priority Data

Dec. 15, 2000 (FI) ............................................. 20002761

(51) Int. Cl.[7] ............................ B01L 3/02; G01N 35/00

(52) U.S. Cl. .................... 422/100; 422/931; 73/863.32; 73/864; 73/864.01

(58) Field of Search .......................... 422/99, 100, 103, 422/931; 73/863.31, 863.42, 863.61, 864, 864.01, 864.87; 436/180

(56) References Cited

U.S. PATENT DOCUMENTS 4,237,095 A * 12/1980 Suovaniemi et al. .... 73/863.32
4,779,467 A * 10/1988 Rainin et al. ............ 73/864.17
4,824,642 A * 4/1989 Lyman et al. ............... 422/100
5,497,670 A * 3/1996 Carl ......................... 73/863.32
5,827,745 A * 10/1998 Astle ........................... 436/54
6,231,813 B1 * 5/2001 Ally et al. .................. 422/100
6,451,263 B1 * 9/2002 Sarrine ........................ 422/100
2001/0039843 A1 * 11/2001 Schoeppe ................ 73/863.32
2001/0043885 A1 * 11/2001 Wanner ....................... 422/100
2004/0013572 A1 * 1/2004 Moore et al. ................. 422/99
2004/0071602 A1 * 4/2004 Yiu ............................ 422/100

* cited by examiner

*Primary Examiner*—Jill Warden
*Assistant Examiner*—Brian R. Gordon
(74) *Attorney, Agent, or Firm*—Kubovcik & Kubovcik

(57) ABSTRACT

A method and a multichannel pipetting apparatus (40) for simultaneous pipetting of a plurality of sample wells (44) or containers. The pipetting channels (12) of the apparatus have been divided into groups, which are connected via an adapter (30) containing a plurality of channels (31) to pipetting tips (20) of a known type. By changing the adapter or the adapter zone (22), a suitable configuration for different sample plates (42) or containers is selected.

7 Claims, 21 Drawing Sheets

PIPETTING METHOD AND MULTICHANNEL PIPETTING APPARATUS

SUBJECT OF THE INVENTION

The present invention relates to a pipetting method for simultaneous pipetting of a plurality of sample wells or containers by means of a multichannel pipetting apparatus comprising a pipetting unit provided with a plurality of pipetting channels, according to which method

- the pipetting channels of the multichannel pipetting unit are divided into groups, at least some of which comprise two or more pipetting channels, and
- the pipetting tips of the pipetting unit are connected to the groups of pipetting channels so that each pipetting tip communicates with all pipetting channels of a group.

In this context, pipetting refers to drawing liquid from sample wells of a micro-sample plate or from separate containers and/or dosing liquid into sample wells of another micro-sample plate or into separate containers.

STATE OF THE ART

Prior-art laboratory measuring instruments employ sample plates of many types, such as micro-sample plates, having a standardised size such that their external dimensions are the same while the number of sample wells varies. The traditional micro-sample plate originally contained 96 sample wells in an 8×12 matrix. The quantity of measuring solution needed in such a sample well is about 200 $\mu$l. To reduce the amount of measuring solution, first a micro-sample plate having the same external dimensions and containing 384 sample wells in a 16×24 matrix was produced. The amount of measuring solution needed in each well was considerably reduced, to about 50 $\mu$l. However, when a very large number of samples are to be measured, it is preferable to use micro-sample plates with still smaller sample wells. This naturally reduces the amount of measuring solution needed. Therefore, many measuring apparatuses are nowadays implemented using micro-sample plates containing 864 wells in a 24×36 matrix, in which the required amount of solution is, e.g., about 10 $\mu$l, or micro-sample plates containing 1536 wells in a 32×48 matrix, in which the required amount of solution is only about 5 $\mu$l. The number of sample wells of the micro-sample plate may be increased still further, e.g., to 9600 sample wells in an 80×120 matrix.

However, the use of many different sample plates has led to problems in laboratories because for each different micro-sample plate a corresponding measuring apparatus is needed. Different types of micro-sample plates cannot be measured crosswise in different apparatuses. For example, a micro-sample plate containing 96 sample wells cannot be measured in an apparatus designed for plates containing 384 sample wells, nor conversely.

Specification EP 1 074 302 A2 presents a solution for adapting a multichannel pipetting apparatus to different sample plates. It has been achieved by using pipetting tips of special construction whose upper end has been enlarged so that it connects at least two pipetting cylinders of the pipetting apparatus. If the cylinders of the multichannel pipetting apparatus are disposed at a distance from each other such that the pipetting apparatus is applicable for pipetting a sample plate containing 384 wells, then, by using pipetting tips of special construction, it is also possible to pipette a sample plate containing 96 wells. In this case, the pipetting tips selected for use in the pipetting apparatus are pipetting tips of special construction whose upper end connects four adjacent pipetting cylinders arranged side by side in a quadratic array.

The solution presented in specification EP 1 074 302 A2 is difficult because it requires many specially constructed pipetting tips with an enlarged upper end, which are difficult and expensive to manufacture. Prior-art advantageous pipetting tips can not be used in it.

OBJECT OF THE INVENTION

The object of the present invention is to disclose a method for eliminating the problems described above.

Features Characteristic of the Invention

The pipetting method of the invention is characterised in that

- groups of two or more pipetting channels are connected to pipetting tips by bringing between the pipetting channels and the pipetting tips an adapter containing several channels,
- by means of the adapter, each one of two or more groups of pipetting channels is connected to a separate pipetting tip via a channel or channel group in the adapter that is in alignment with the group,
- and that the channel or channel group in the adapter is connected to the pipetting tip, which preferably is a conventional, funnel-shaped pipetting tip.

A preferred embodiment of the pipetting method of the invention is characterised in that the adapter between the pipetting channels and the pipetting tips is replaced with a different adapter depending on the number of pipetting channels comprised in the group to be connected to each pipetting tip.

A second preferred embodiment of the pipetting method of the invention is characterised in that the adapter placed between the pipetting channels and the pipetting tips is moved laterally so that the desired channel or channel group is brought to a position directly opposite to the selected pipetting channels, said selection being made according to the number of pipetting channels comprised in the group to be connected to each pipetting tip.

A third preferred embodiment of the pipetting method of the invention is characterised in that by means of the adapter movable in the pipetting apparatus, the pipetting tips to be connected to the adapter are fetched according to the size of the sample wells or containers to be pipetted, whereupon the adapter is moved laterally so that the channel or channel group in the adapter which is in alignment with the pipetting tip comes to a position directly opposite to the desired group of pipetting channels, this selection being made according to the number of pipetting channels comprised in the group to be connected to each pipetting tip.

The invention also relates to a multichannel pipetting apparatus for simultaneous pipetting of a plurality of sample wells or containers, said pipetting apparatus comprising

- a pipetting unit comprising a number of pipetting channels
- in which pipetting apparatus the pipetting channels have been divided into groups, at least some of which comprise two or more pipetting channels,
- and the pipetting tips of the pipetting unit are connected to the groups of pipetting channels so that each pipetting tip communicates with all pipetting channels in a group.

The pipetting apparatus of the invention is characterised in that the pipetting unit of the pipetting apparatus comprises at least one adapter placed between the pipetting channels and the pipetting tips and containing a number of channels or channel groups connecting the groups of pipetting channels to the pipetting tips, and that each channel or channel group in the adapter is connected to one group of pipetting channels and via an orifice to one pipetting tip, which preferably is a conventional, funnel-shaped pipetting tip.

By employing the solution of the invention, a multichannel pipetting apparatus is achieved which replaces several prior-art apparatuses. A further advantage of the solution is that most embodiments of the invention can also use pipetting tips that are previously known.

Embodiments of the Apparatus of the Invention

A preferred embodiment of the pipetting apparatus of the invention is characterised in that the pipetting unit comprises at least two different adapters which can be alternately placed in the pipetting unit, between the pipetting channels and the pipetting tips, that the adapters contain different channels or channel groups that the channels or channel groups in different adapters differ from each other in that a different number of pipetting channels can be connected via them to each pipetting tip.

A second preferred embodiment of the pipetting apparatus of the invention is characterised in that the pipetting unit comprises an adapter comprising at least two different zones containing different channels or channel groups, the channels or channel groups located in different zones of the adapter differ from each other in that a different number of pipetting channels can be connected via them to each pipetting tip, and that the adapter can be displaced or moved so as to bring different zones alternately into connection with the pipetting channels.

A third preferred embodiment of the pipetting apparatus of the invention is characterised in that the pipetting apparatus comprises a track for moving micro-sample plates laterally to a position directly opposite to the pipetting unit, the pipetting unit contains one or more adapters which can be moved above the track in a direction perpendicular to the direction of movement of the track, and that one or more adapters contain two or more different zones containing channels or channel groups which connect a different number of pipetting channels to each pipetting tip.

A fourth preferred embodiment of the pipetting apparatus of the invention is characterised in that the adapter is provided with a plurality of pipetting tips or pipetting tip connecting elements fixedly attached to it.

A fifth preferred embodiment of the pipetting apparatus of the invention is characterised in that the channels or channel groups of the adapter are fitted against a seal on the lower surface of the frame of the pipetting unit or against suitable connecting elements.

Yet another preferred embodiment of the pipetting apparatus of the invention is characterised in that the pipetting tips are fitted against a seal on the lower surface of the adapter or against suitable connecting elements.

EXAMPLES OF EMBODIMENTS

In the following, the invention will be described by the aid of examples with reference to the attached drawings, wherein

List of Drawings

FIG. 1 is a diagram representing a prior-art pipetting unit and associated pipetting tips in vertical section.

FIG. 2 corresponds to FIG. 1 and shows the pipetting tips as connected to the pipetting unit.

FIG. 3 corresponds to FIG. 1 and presents a second prior-art pipetting unit and associated pipetting tips.

FIG. 4 corresponds to FIG. 3 and shows the pipetting tips as connected to the pipetting unit.

FIG. 5 presents a diagrammatic vertical section of a pipetting unit according to the invention with its parts separated from each other.

FIG. 6 corresponds to FIG. 5 and presents the pipetting unit in an assembled state.

FIG. 7 corresponds to FIG. 5 and presents a pipetting unit according to a second embodiment of the invention with its parts separated from each other.

FIG. 8 corresponds to FIG. 7 and presents the pipetting unit in an assembled state.

FIG. 9 corresponds to FIG. 5 and presents a pipetting unit according to a third embodiment of the invention with its parts separated from each other.

FIG. 10 corresponds to FIG. 9 and presents the pipetting unit in an assembled state.

FIG. 11 corresponds to FIG. 5 and presents a pipetting unit according to a fourth embodiment of the invention with its parts separated from each other.

FIG. 12 corresponds to FIG. 11 and presents the pipetting unit in an assembled state.

FIG. 13 corresponds to FIG. 5 and presents a pipetting unit according to a fifth embodiment of the invention with its parts separated from each other.

FIG. 14 corresponds to FIG. 13 and presents the pipetting unit in an assembled state.

FIG. 15 corresponds to FIG. 5 and presents a pipetting unit according to a sixth embodiment of the invention with its parts separated from each other.

FIG. 16 corresponds to FIG. 15 and presents the pipetting unit in an assembled state.

FIG. 17 corresponds to FIG. 5 and presents a pipetting unit according to a seventh embodiment of the invention with its parts separated from each other.

FIG. 18 corresponds to FIG. 17 and presents the pipetting unit in an assembled state.

FIG. 19 presents a section taken of the unit in FIG. 5 along line XIX—XIX.

FIG. 20 presents a section taken of the unit in FIG. 7 along line XX—XX.

FIG. 21 presents a section taken of the unit in FIG. 9 along line XXI—XXI.

FIG. 22 presents a section taken of the unit in FIG. 13 along line XXII—XXII.

FIG. 23 corresponds to FIG. 5 and presents a pipetting unit according to an eighth embodiment of the invention with its parts separated from each other.

FIG. 24 presents a diagrammatic vertical section through a pipetting unit according to a ninth embodiment of the invention and its replaceable parts.

FIG. 25 corresponds to FIG. 5 and presents a diagrammatic vertical section through a pipetting unit according to a tenth embodiment of the invention.

FIG. 26 presents a diagrammatic top view of a second pipetting apparatus according to the invention.

FIG. 27 presents a diagrammatic lateral view of the pipetting apparatus in FIG. 26.

FIG. 28 presents an axonometric view of a third pipetting apparatus according to the invention.

FIG. 29 presents the replaceable part of the pipetting unit according to the invention in top view.

FIG. 30 corresponds to FIG. 29 and presents a second embodiment of the replaceable part of the pipetting unit in top view.

FIG. 31 presents a diagram visualising the layout of the flow channels of the pipetting unit of the invention.

FIG. 32 corresponds to FIG. 29 and presents a top view of a third embodiment of the replaceable part of the pipetting unit.

FIG. 33 presents a diagrammatic vertical section of a pipetting unit according to an eleventh embodiment of the invention.

FIG. 34 corresponds to FIG. 33 and presents the pipetting unit in another position.

Figure 1:
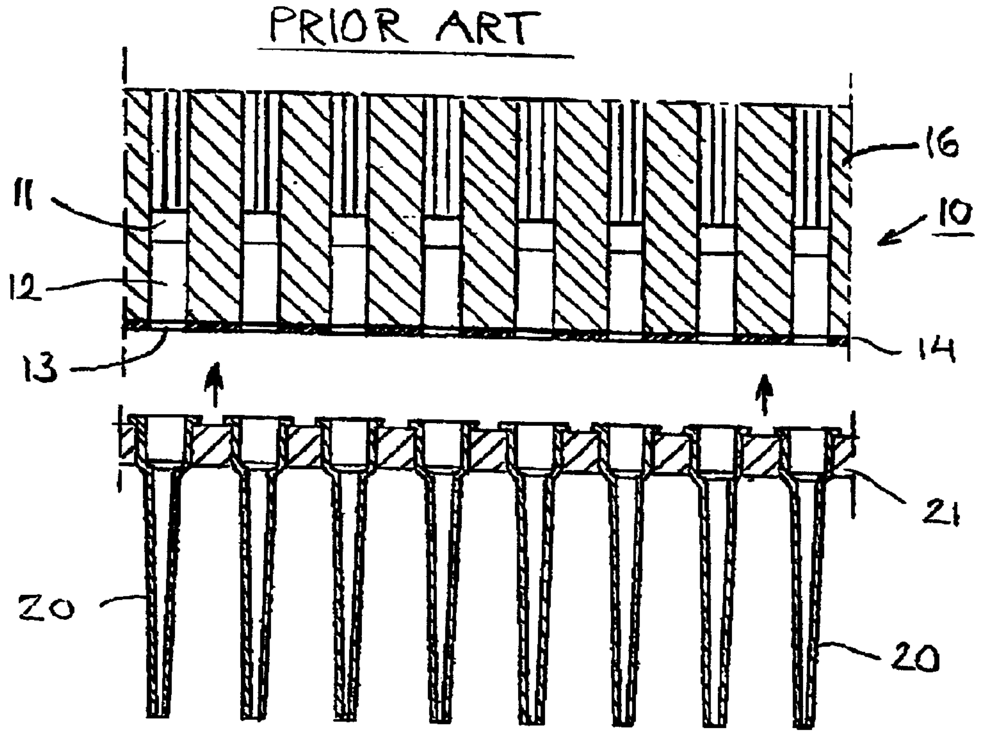
FIG. 1 shows a vertical section of a prior-art pipetting unit 10 with a frame part 16 containing a plurality of dosage cylinders 12 provided with pistons 11. The pipetting tips 20 are brought into the pipetting unit 10 as a group placed in a support plate 21, so that all the pipetting tips 20 can be connected simultaneously to the dosage orifices 13 of the pipetting unit 10. The lower surface of the frame 16 of the pipetting unit 10 is provided with a rubber seal 14 for sealing the joint between the dosage orifices 13 and the pipetting tips 20 pressed against the seal 14.

To allow simultaneous dosage by a plurality of pipetting tips 20, the pipetting tips 20 in the pipetting unit 10 have to be arranged in the same way as the sample wells or separate containers used as pipetting sources. Similarly, the pipetting tips 20 have to be disposed at the same distances between them as the sample wells or separate containers used as pipetting sources.

After this, the liquid can be dosed into the sample wells or separate containers in another sample plate which have been arranged in the way as the sample wells or separate containers used as pipetting sources. The receiving sample wells also have to be disposed at the same distances between them as the sample wells or separate containers used as pipetting sources.

However, if the pipetting tips 20 are sufficiently narrow, then the liquid can also be dosed into the sample wells in another sample plate in which the wells are disposed at distances equalling only half the distances between the sample wells used as pipetting sources. In this case, pipetting is performed by first dosing the liquid into every second sample well in the other sample plate and then into the sample wells that were left between said every second well during the first pipetting operation. These two dosage operations have to be performed both in the widthways direction and in the lengthways direction of the sample plate, so this sample plate containing a quadruple number of sample wells can be filled via four dosage operations.

In the manner described above, using a prior-art pipetting apparatus with a pipetting unit containing 24 pipetting tips, it is possible to dose liquid from 24 sample containers or from a sample plate containing 24 sample wells into another micro-sample plate containing 24 or 96 sample wells. Similarly, using another prior-art pipetting apparatus with a pipetting unit containing 96 pipetting tips, it is possible to pipette from a micro-sample plate containing 96 sample wells into another micro-sample plate containing 96 or 384 sample wells.

However, using the prior-art apparatus, it is difficult to pipette, e.g., from a sample plate containing 24 sample wells into a micro-sample plate containing 384 sample wells. This is generally due to the fact that pipetting tips designed for larger sample wells are too large to be inserted into smaller sample wells. Obviously enough, 384 sample wells accommodated in a sample plate of the same size must be considerably smaller than e.g. the sample wells in a micro-sample plate containing 96 sample wells. Therefore, it is generally likewise impossible to pipette from a micro-sample plate containing 96 sample wells into another micro-sample plate containing 1536 sample wells. It is true that pipetting can be performed using pipetting tips that are small enough to be inserted into small sample wells. In this case, however, there is the problem that the pipetting tips can only contain such a small amount of liquid that filling larger sample wells is a very slow operation. The pipetting would have to be repeated several times. Therefore, in current practice several pipetting units of different sizes are needed to enable dosage operations as described above to be carried out efficiently.

Figure 3:
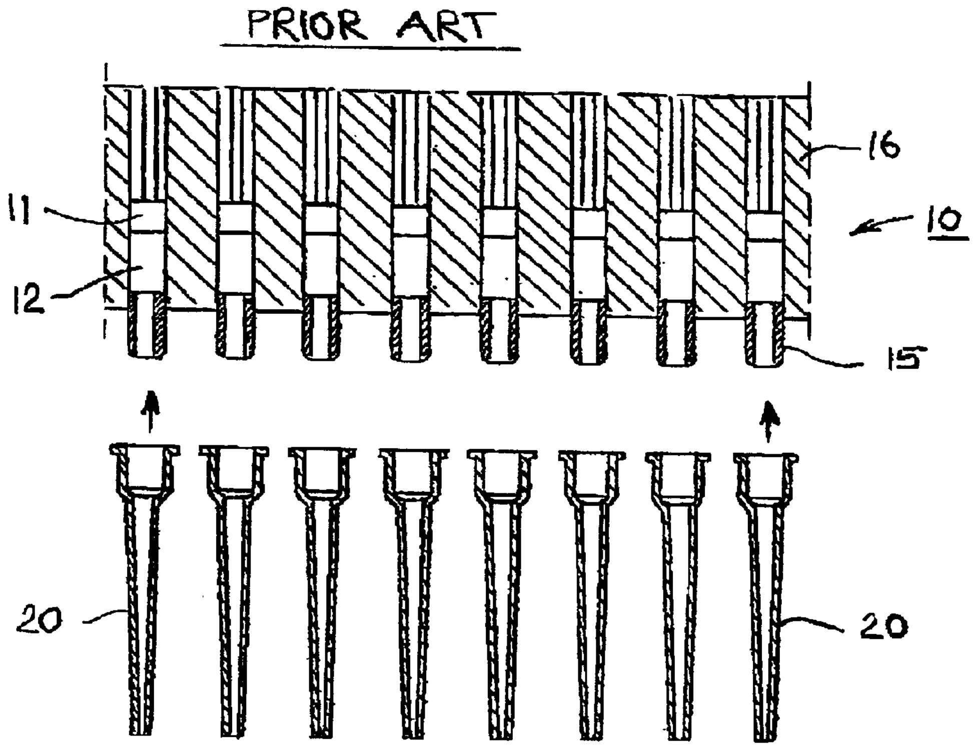

FIG. 3 presents another prior-art pipetting unit 10 which also uses separate pipetting tips 20. The pipetting tips 20 are pressed into connecting elements 15 placed opposite to the dosage cylinders 12 in the frame 16 of the pipetting unit 10. In this example, the connecting elements 15 and the pipetting tips 20 are so closely fitted that no separate seals are needed. However, there are many different ways of connecting the pipetting tips 20*a*, including solutions in which one or more seals, such as, e.g., O-rings are used.

Figure 4:
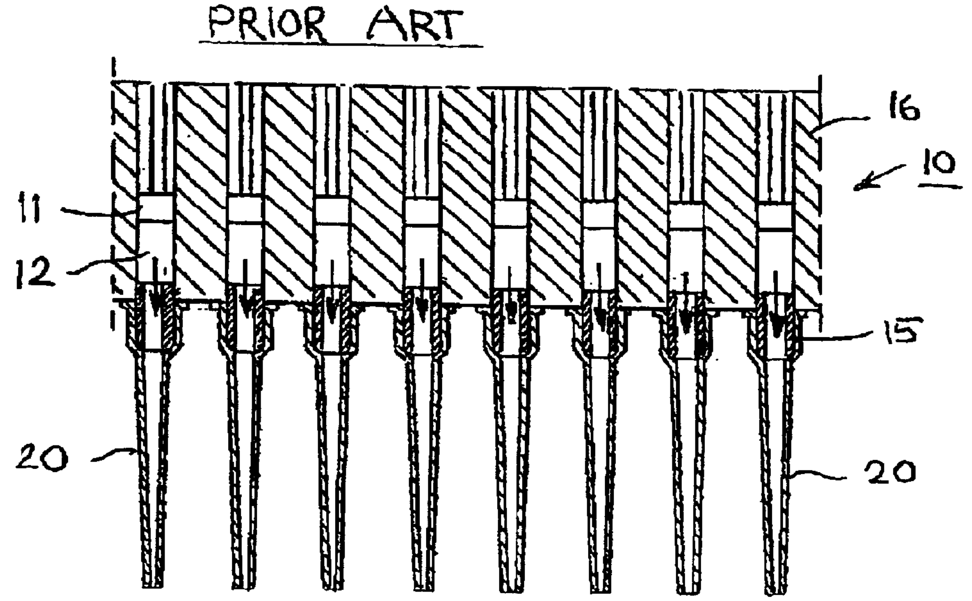

The pipetting tips 20 in FIG. 3 can be pressed into the connecting elements 15 one at a time or by using a separate pipetting tip holder, either manually or mechanically. In FIG. 4, the pipetting tips 20 have been connected to the pipetting unit 10.

Figure 5:
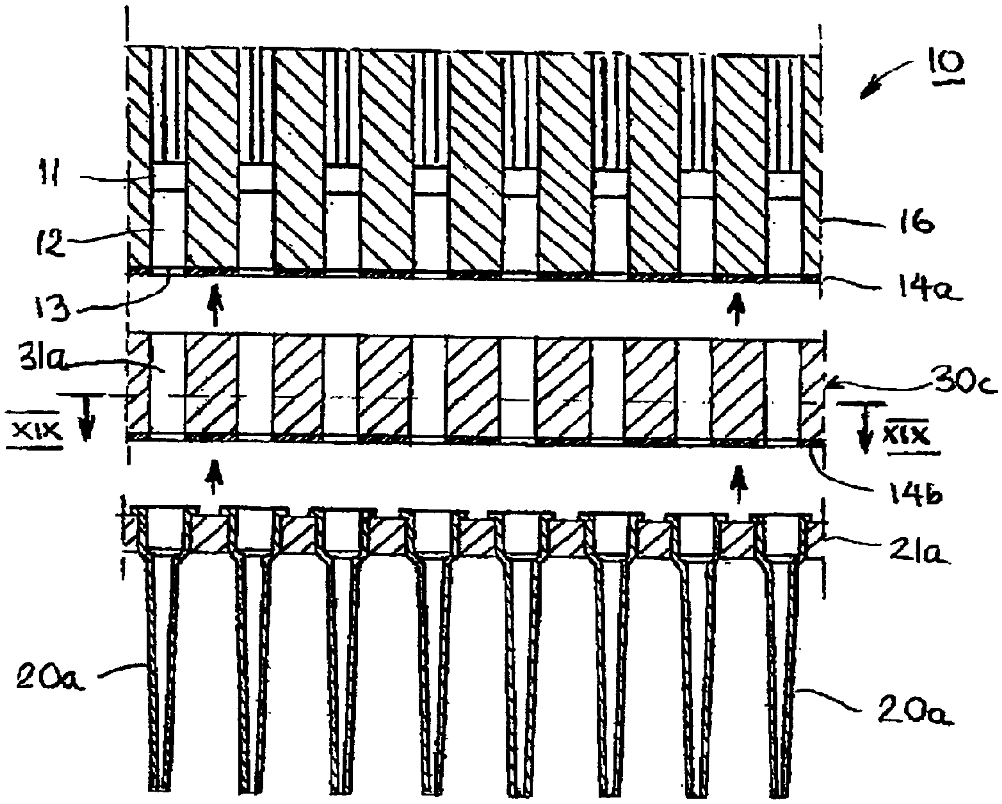

FIG. 5 presents a pipetting unit 10 according to the invention, which is substantially different from prior-art structures. The operation of the assembly presented in FIG. 5 does not in itself differ from the operation of previously known apparatuses, but this pipetting unit 10 forms part of a configuration the various details of which will be described in connection with the following figures. The pipetting unit 10 in FIG. 5 comprises an adapter 30*a* placed between the dosage cylinders 12 in the frame 16 and the pipetting tips 20*a*, which adapter forms an essential part of the pipetting unit 10 of the invention. The adapter 30*a* is provided with channels 31*a* through which the dosage orifices 13 of the dosage cylinders 1 communicate with the pipetting tips 20. FIG. 5 shows that in this example embodiment of the pipetting unit 10 of the invention, the numbers of dosage orifices 13 of dosage cylinders 12, channels 31*a* and pipetting tips 20 are the same.

Figure 2:
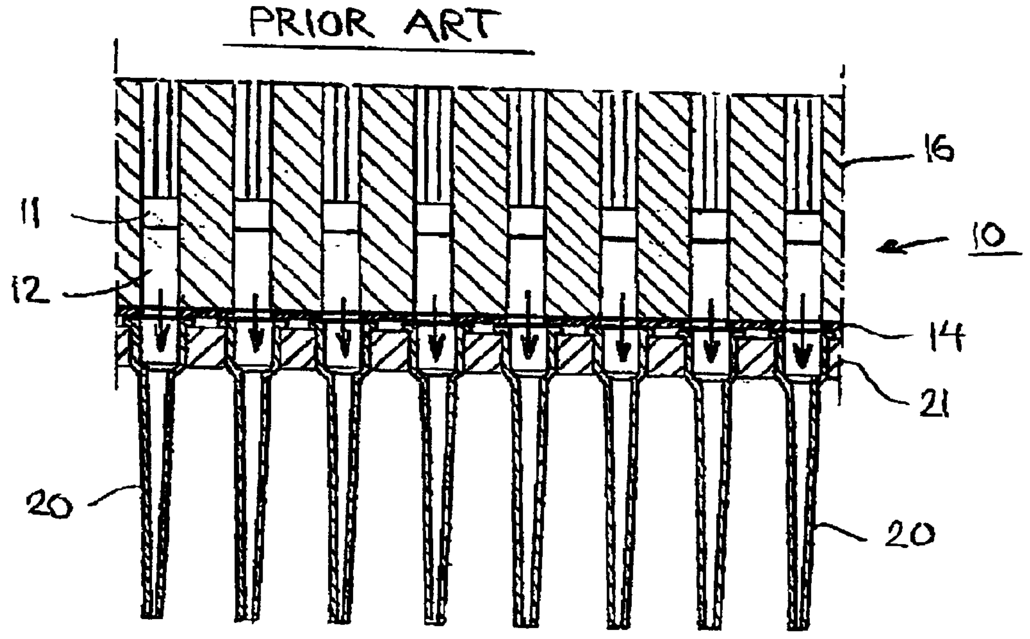
In FIG. 2, the pipetting tips 20 placed in the support plate 21 have been connected to the pipetting unit 10. After this, using the pipetting tips 20 of the pipetting unit 10, liquid is drawn by suction from the sample wells of a first micro-sample plate or from separate containers and dosed into the sample wells of a second micro-sample plate or into separate containers. To draw liquid into the pipetting tip 20, the piston 11 of the dosage cylinder 12 in the frame 16 of the pipetting unit 10 is moved upward, thus producing a negative pressure in the air space of the dosage cylinder 12. The liquid being pipetted now rises into the pipetting tip 20. Dosage is performed in reverse order by moving the piston 11 of the dosage cylinder 12 in the pipetting unit 10 downward, causing the liquid being dosed to be correspondingly removed from the pipetting tip 20.
Figure 6:
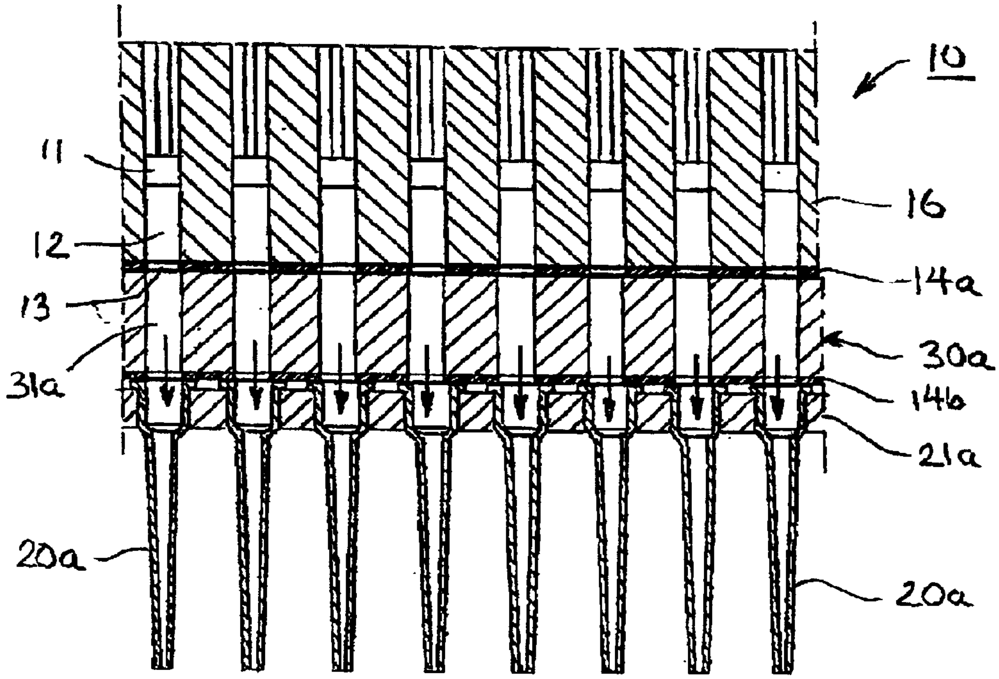

The lower surface of the adapter 30*a* is provided with a seal 14*b* which is identical to the seal 14 on the lower surface of the pipetting unit 10. Thus, both the joint between the adapter 30*a* and the frame 16 of the pipetting unit 10 and the joint between the implement and the pipetting tips 20*a* are sealed. FIG. 5 also shows that the pipetting tips 20*a* and their support plate 21*a* are identical to those in the prior-art pipetting unit 10 presented in FIGS. 1 and 2. In other words, known standard-type pipetting tips can be used in this embodiment of the pipetting unit 10 of the invention. FIG. 6 presents a pipetting unit 10 according to the invention in an assembled state and ready for use. The inventive significance of the adapter 30*a* is described in connection with the following figures.

Figure 7:
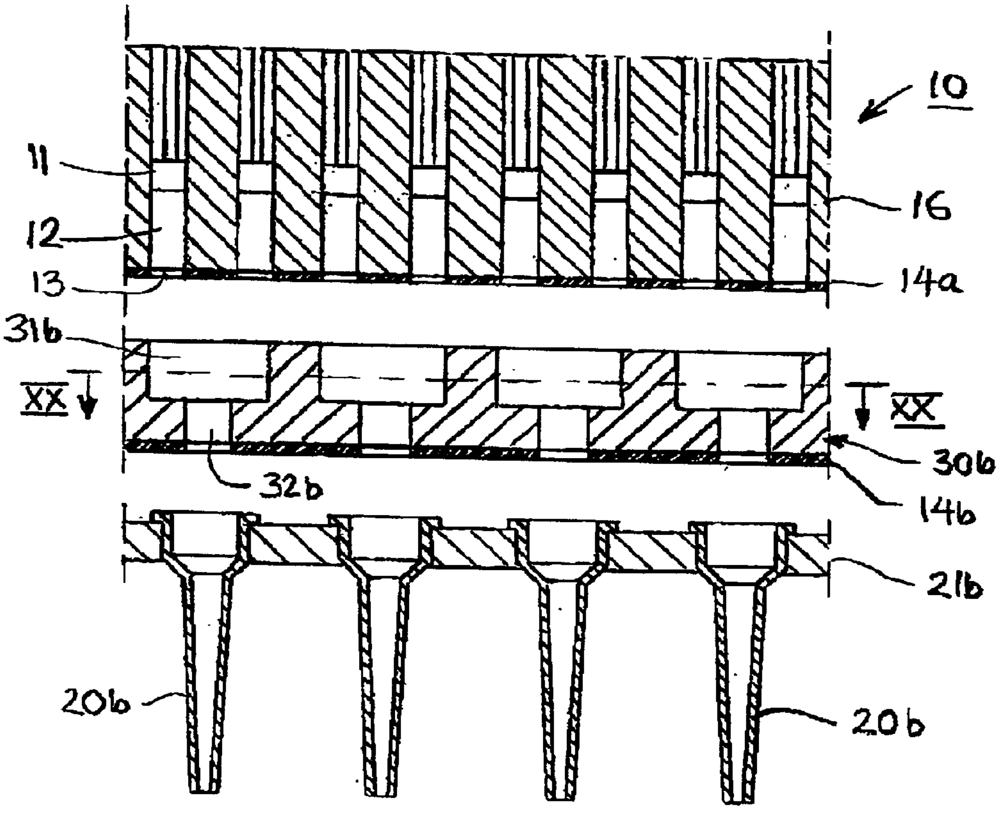

FIG. 7 presents a second embodiment of the pipetting unit 10 of the invention in which the difference from previously known solutions can be clearly seen. The essential point is that a completely different adapter 30*b* has been connected to a pipetting unit 10 frame 16 like that presented in FIG. 6. The difference between adapter 30*b* and the adapter 30*a* presented in FIG. 6 is that, as can be seen from the cross-sectional view in FIG. 7, channels 31*b* connect the dosage orifices 13 of two dosage cylinders 12 to one larger orifice 32*b*, which in turn is connected to a pipetting tip 20*b* of a conventional type. The channels 31*b* in the adapter 30*b* connect two dosage cylinder 12 dosage orifices 13 in both widthways and lengthways directions of the adapter 30*b,* each pipetting tip 20*b* being thus connected to four dosage cylinder 12 dosage orifices 13, as is later shown in a sectional view in FIG. 20.

Figure 8:
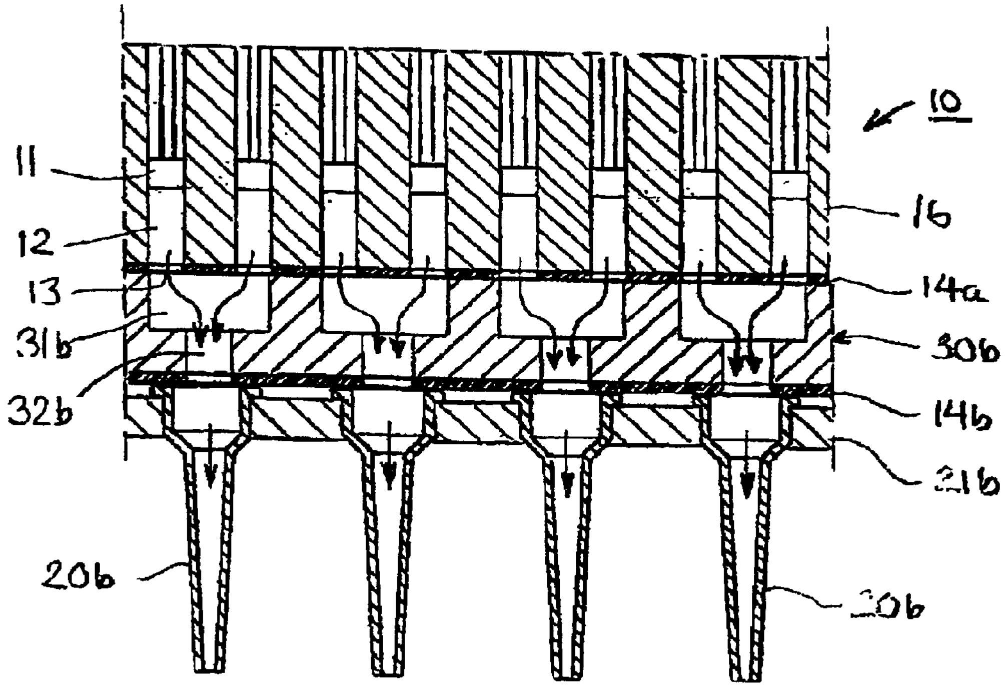

FIG. 8 presents the pipetting unit 10 of FIG. 7 in an assembled state. In the embodiments in FIGS. 7 and 8, the pipetting unit 10 and its frame 16 may be the same as in the previous figures, in other words, the apparatus is a pipetting unit 10 (known in itself) in which only an adapter 30*b* according to the invention has been changed. At the same time, the adapter 30*b* has been fitted with larger pipetting tips 20*b,* which, however, may also consist of existing, i.e., known standard-type pipetting tips 20*b*. The essential point about the solutions presented in FIGS. 5–8 is that, by using different adapters 30*a* and 30*b,* the known basic part 16 of a pipetting unit 10 and known pipetting tips 20*b* can be used in considerably more versatile ways than before. In other words, a simple solution enables a single apparatus to function like two or more prior-art apparatuses together.

Figure 9:
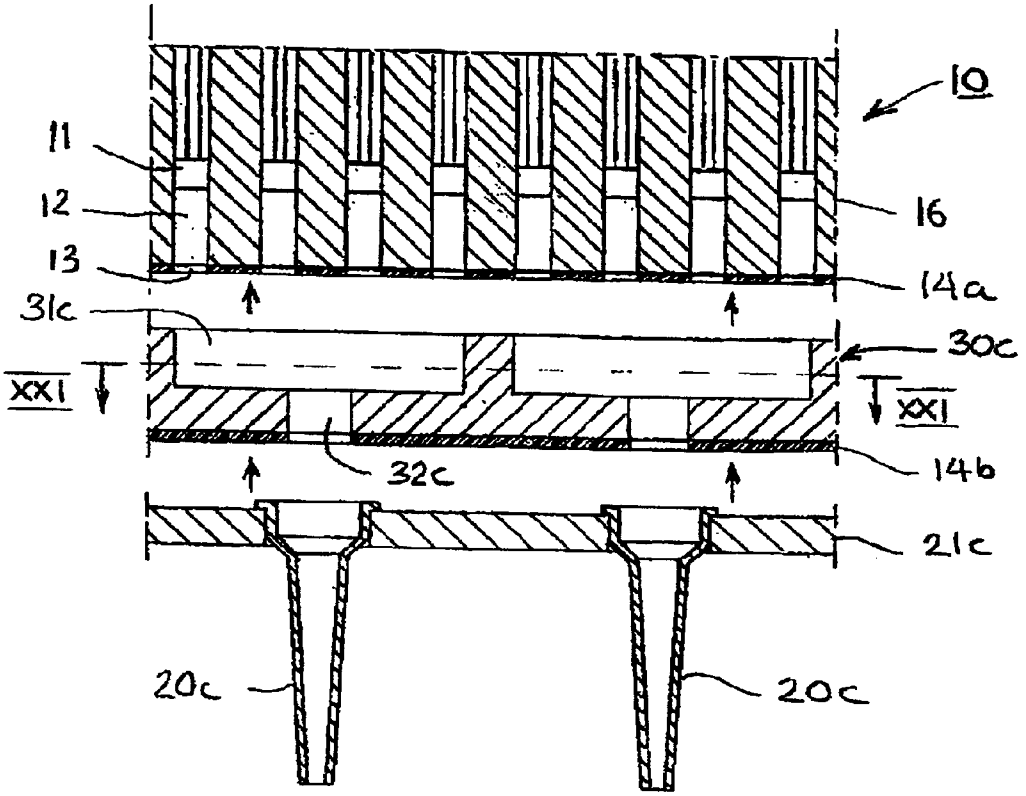
Figure 10:
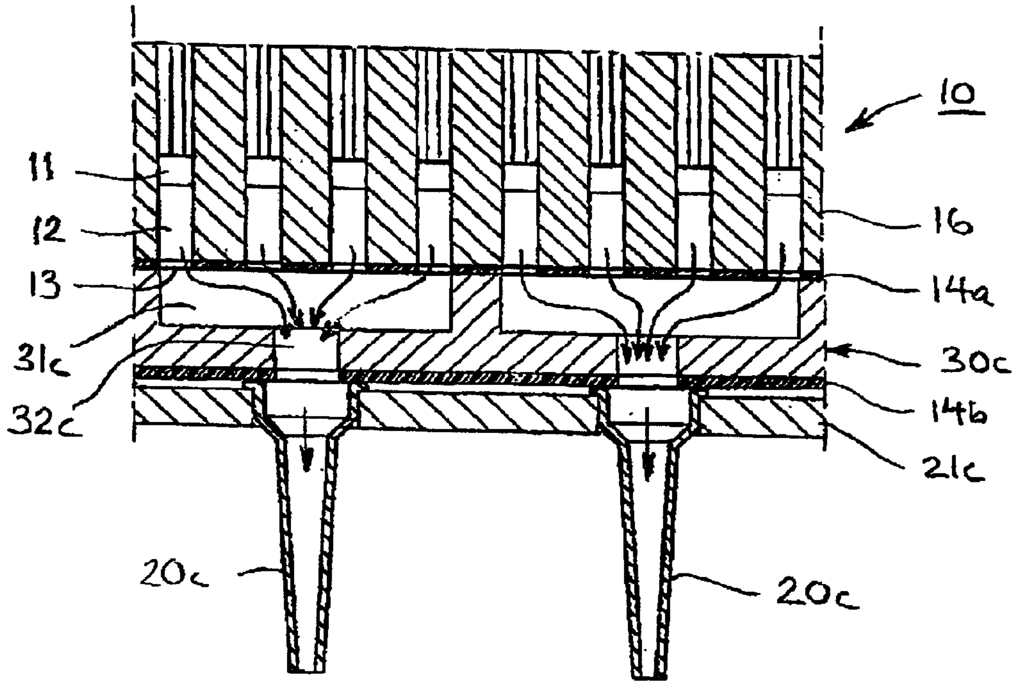

FIG. 9 presents yet another variation of the solutions presented in FIGS. 5–8. In this case, a channel 31*c* in the third adapter 30*c* according to the invention connects the dosage orifices 13 of four dosage cylinders 12 in a cross-sectional view to a larger orifice 32*c*, which again is connected to a pipetting tip 20*c* of conventional type. Here, too, it is to be noted that the channels 31*c* in the adapter 30*c* connect four dosage cylinder 12 dosage orifices 13 in both widthways and lengthways directions of the adapter 30*c,* each pipetting tip 20*c* being thus connected to sixteen dosage cylinder 12 dosage orifices 13, as is later shown in the cross-sectional view in FIG. 21. FIG. 10 presents the pipetting unit 10 of FIG. 9 in an assembled state.

In a way, the pipetting units 10 presented in FIGS. 6–10 form part of the same entity, in which the basic part of the pipetting unit 10 and the frame 16 comprised in it and containing the dosage cylinders are the same in all these figures. Thus, by only changing the adapter 30 and the associated individual pipetting tips 20 (known in themselves), pipetting can be performed efficiently between micro-sample plates or corresponding separate containers of widely varying sizes.

As generally a single pipetting tip size is well applicable for pipetting two or three different-sized sample wells, it is possible, by alternately using apparatuses as presented in FIGS. 6–10, to pipette efficiently and quickly at least 6–7 differently sized sample wells by means of three pipetting tips 20*a*–20*c* of different sizes. In practice, this is enough to allow pipetting of all sample wells of different sizes needed in laboratory work. However, if a still wider range of application is required, then, according to the invention, the number of adapters 30 used in the pipetting unit 10 can be increased still further.

Figure 11:
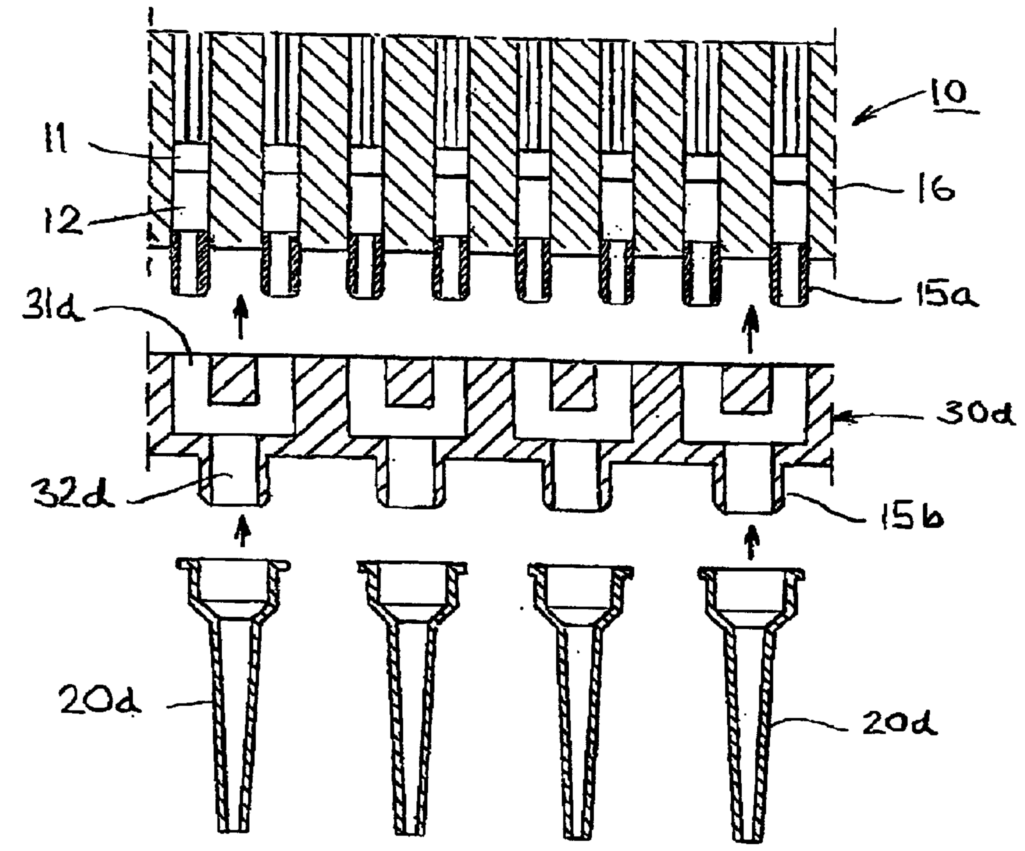
Figure 12:
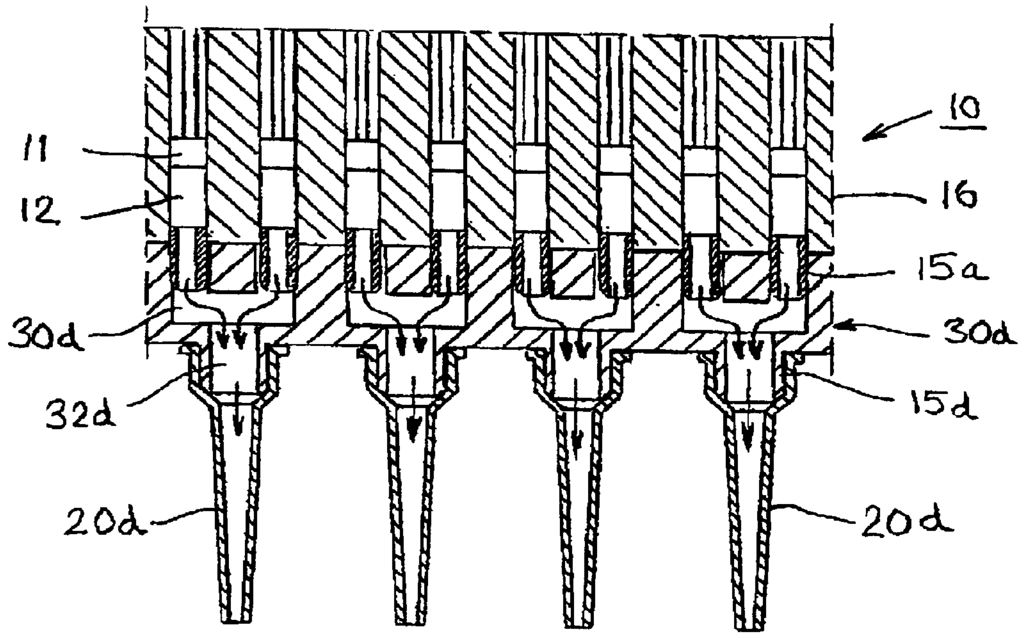

FIGS. 11 and 12 present an embodiment comprising a pipetting unit 10 and channels 31*d* in an adapter 30*d* which in the cross-sectional view connect two dosage cylinders 12 to one orifice 32*d* and further to a pipetting tip 20*d.* As in the embodiment in FIG. 7, the channels 31*d* connect two dosage cylinders 12 in both widthways and lengthways directions of the adapter 30*d.* Each pipetting tip 20*d* is thus connected to four dosage cylinders 12.

As a difference from FIG. 7, the channels 31*d* in the adapter 30*d* in FIGS. 11 and 12 are fitted directly without separate seals to the connecting elements 15*a* added to the frame 16. The orifices 32*d* in the adapter 30*d* are provided with corresponding connecting elements 15*b* for the pipetting tips 20*d.*

Figure 13:
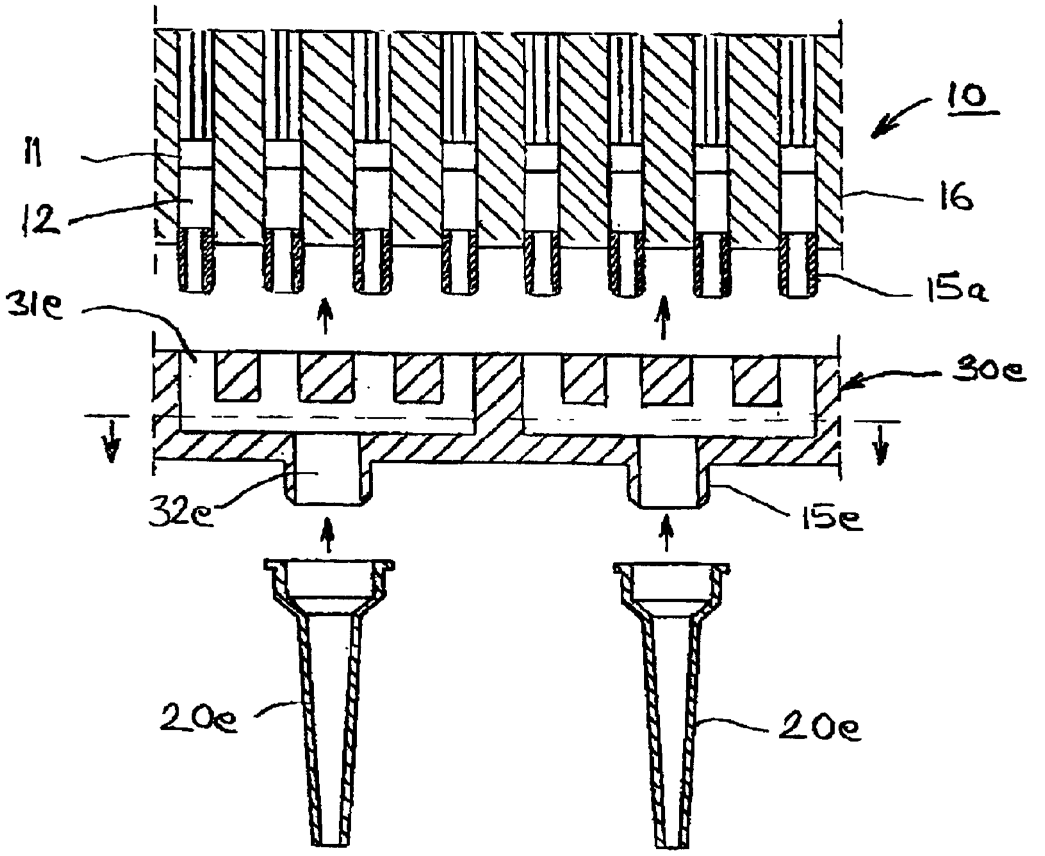
Figure 14:
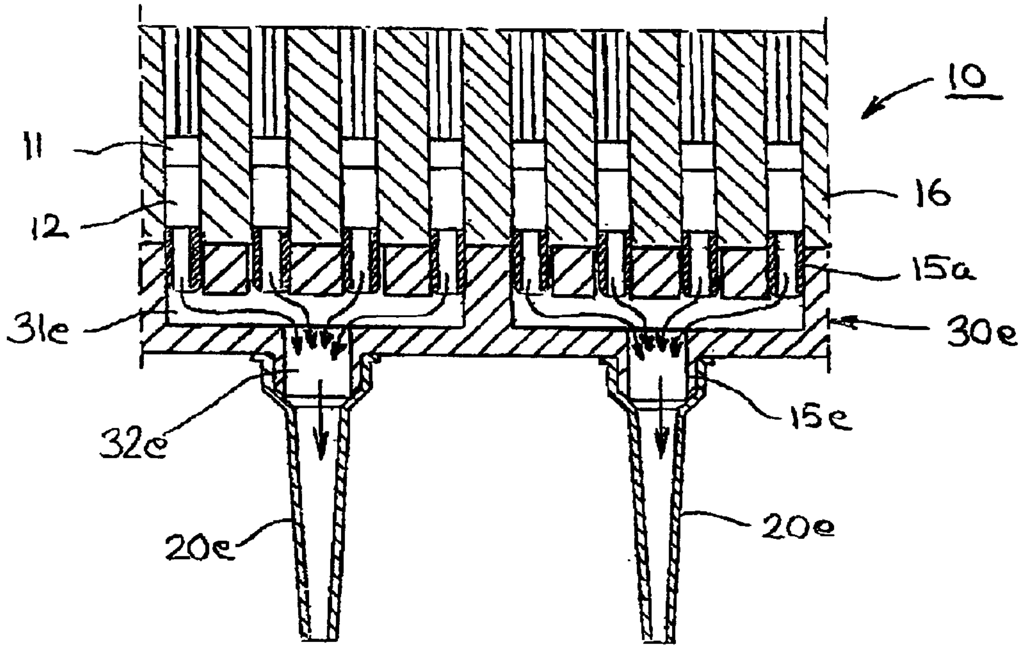

FIGS. 13 and 14 present an embodiment in which the adapter 30*e* is provided with channels 31*e* which in the cross-sectional view connect four dosage cylinders 12, i.e., in the widthways and lengthways directions a total of sixteen dosage cylinders 12 to one orifice 32*e*, and further to a pipetting tip 20*e* of a known type. In this embodiment, too, the adapter 30*e* can be connected via the orifices of the channels 31*e* to the connecting elements 15*a* of the frame 16 of the pipetting unit 10 without separate seals. Similarly, a conventional pipetting tip 20*e* can be connected to the connecting element 15*e* of the adapter 30*e* without separate seals. A sectional view of this adapter 30*e* is presented in FIG. 22.

The solutions presented in FIGS. 10–14 are also in a way part of the same entity in which different adapters 30 and pipetting tips 20, conventional in themselves but of different sizes, connected to them can be used in connection with the basic part of the pipetting unit 10 and its frame 16. In this way, a very wide range of use of the same multichannel pipetting apparatus is achieved in the pipetting of sample wells of different sizes.

Figure 15:
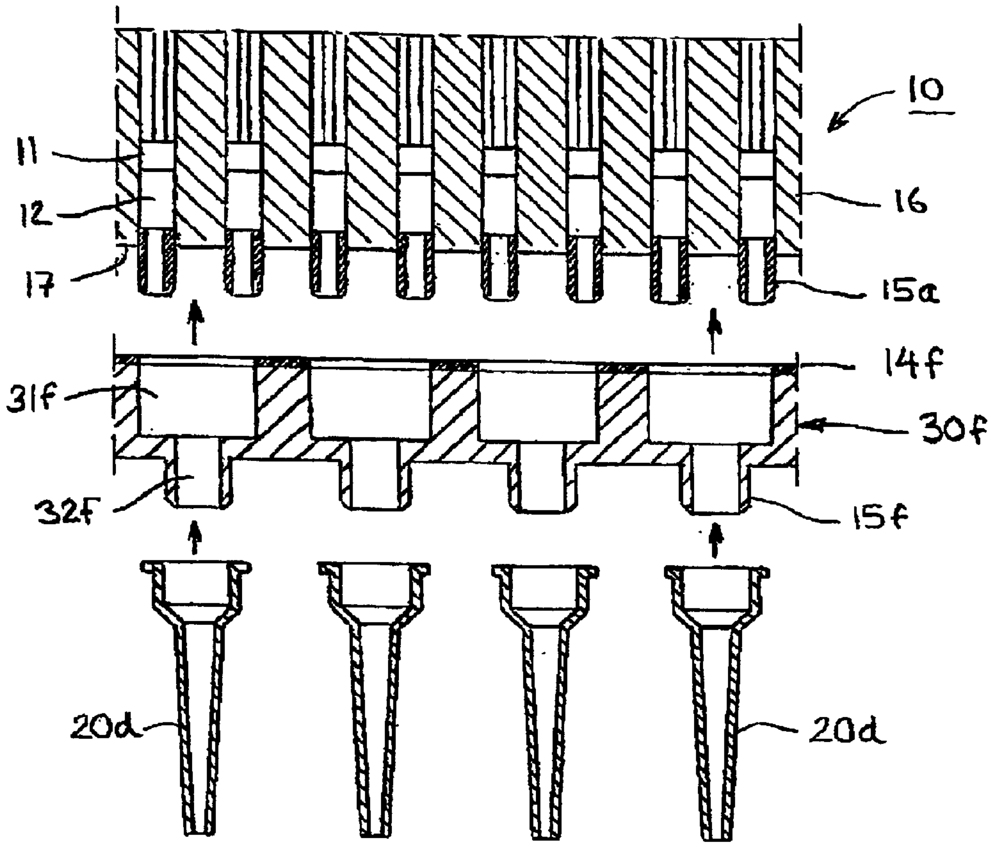
Figure 16:
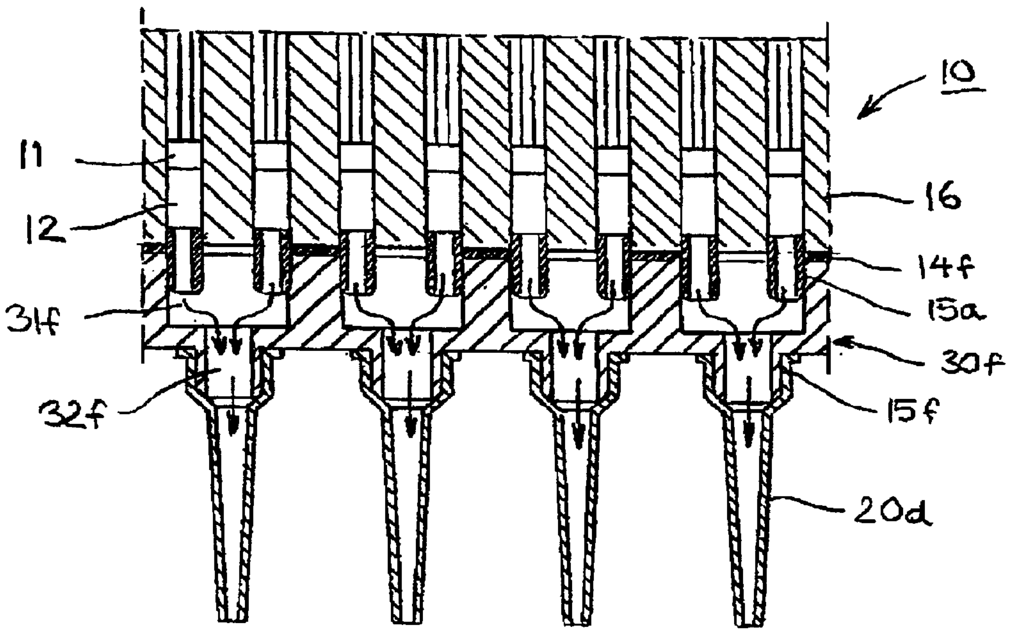

FIGS. 15 and 16 present an embodiment of a pipetting unit 10 in which the upper surface of the adapter 30*f* is provided with a seal 14*f.* In this case, the adapter 30*f* can be fitted tightly against the lower surface 17 of the frame 16 of the pipetting unit 10 as an alternative to connection to connecting elements 15*a,* which was the case in the previous example. In this example, one large common channel 31*f* connects four adjacent dosage cylinders 12 arranged in a quadratic array to a single orifice 32*f.*

The adapter 30*f* can also be varied in numerous other ways by combining different types of joint at its upper and lower surfaces. The drawings and this description do not present all these alternatives. For example, the lower surface of adapter 30*f* may be straight, as in FIG. 7, and provided with a seal 14 instead of connecting elements 15*f*. In this case, in place of pipetting tips 20*d*, there will be standard-type pipetting tips 20*b* together with a support plate 21*b*, as in FIG. 7.

Figure 17:
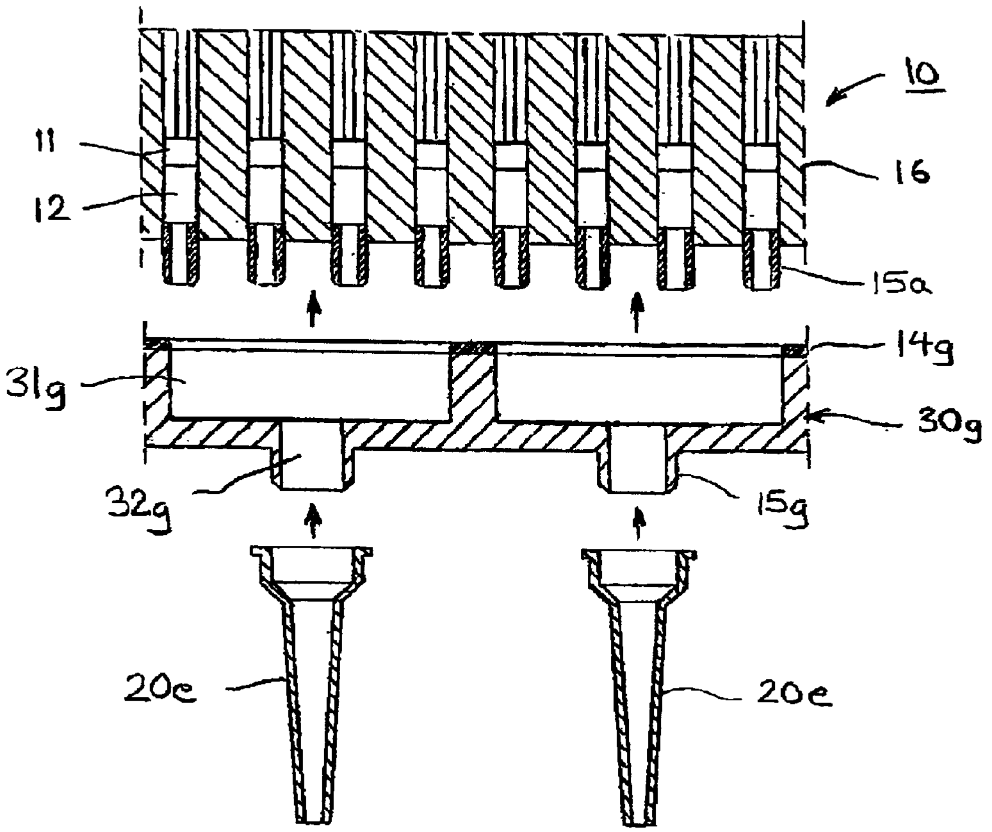
Figure 18:
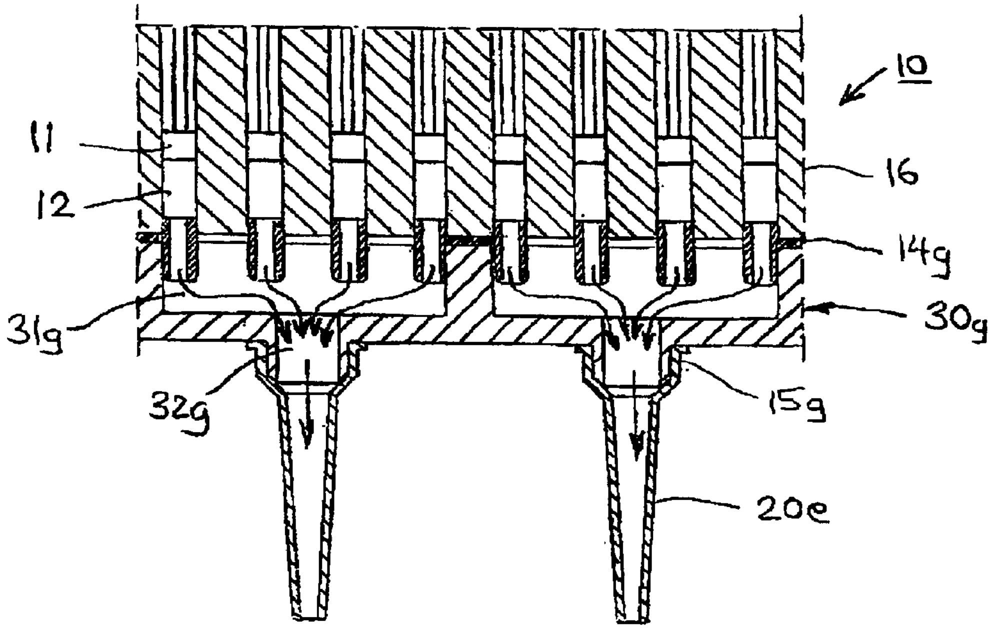
Figure 19:
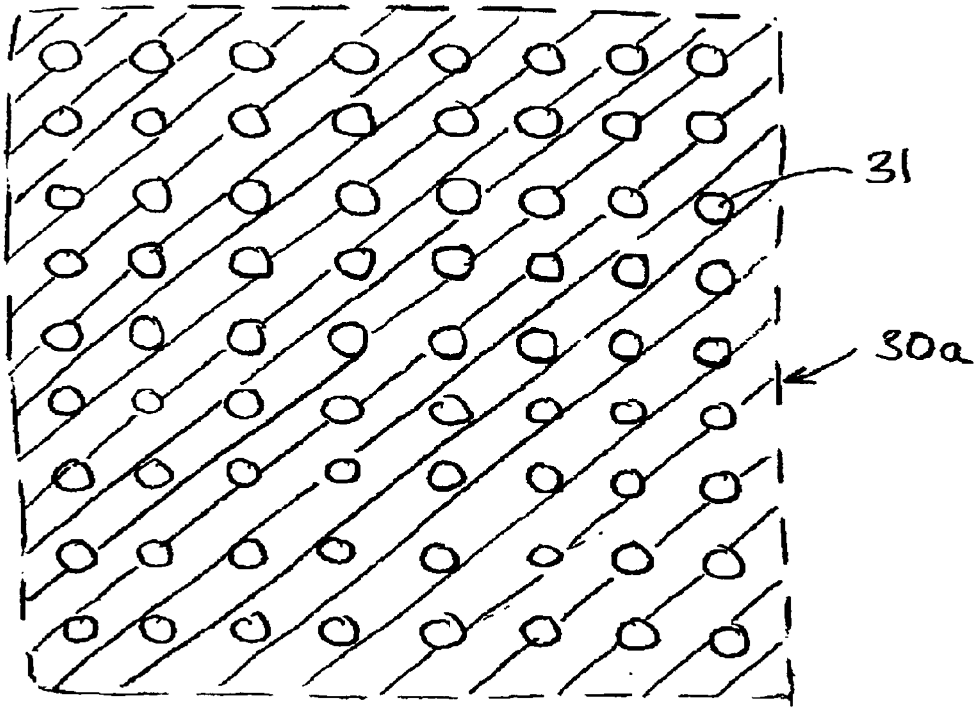

FIGS. 17 and 18 present a solution resembling the one presented in FIGS. 15 and 16, likewise with a seal 14*g* on the upper surface of the adapter 30*g*. The difference in this example is that, instead of connecting four dosage cylinders 12 of the frame 16 of the pipetting unit 10, one large common channel 31*g* connects sixteen dosage cylinders 12 to an orifice 32*e* in the adapter 30*g* and further to a pipetting tip 20*e* of a known type.

FIGS. 19–22 present horizontal sections through certain alternative adapters 30*a*, 30*b*, 30*c* and 30*e*. In the adapter 30*a* in FIG. 19, each channel 31*a* connects only one dosage cylinder directly to one pipetting tip, as shown in FIGS. 5 and 6.

Figure 20:
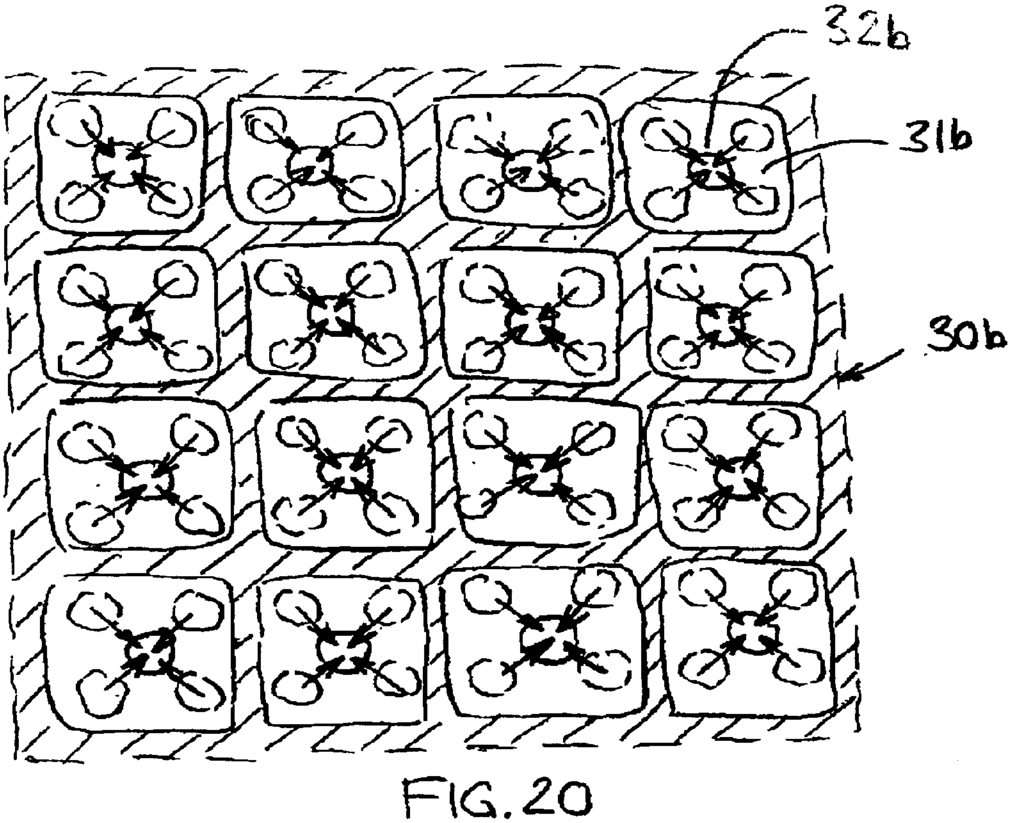

In the adapter 30*b* in FIG. 20, each channel 31*b* connects four dosage cylinders 12 in the frame 16 of the pipetting unit 10 to one orifice 32*b* in the adapter 30*b* and further to a pipetting tip 20*e* of a known type as shown in FIGS. 7 and 8.

Figure 21:
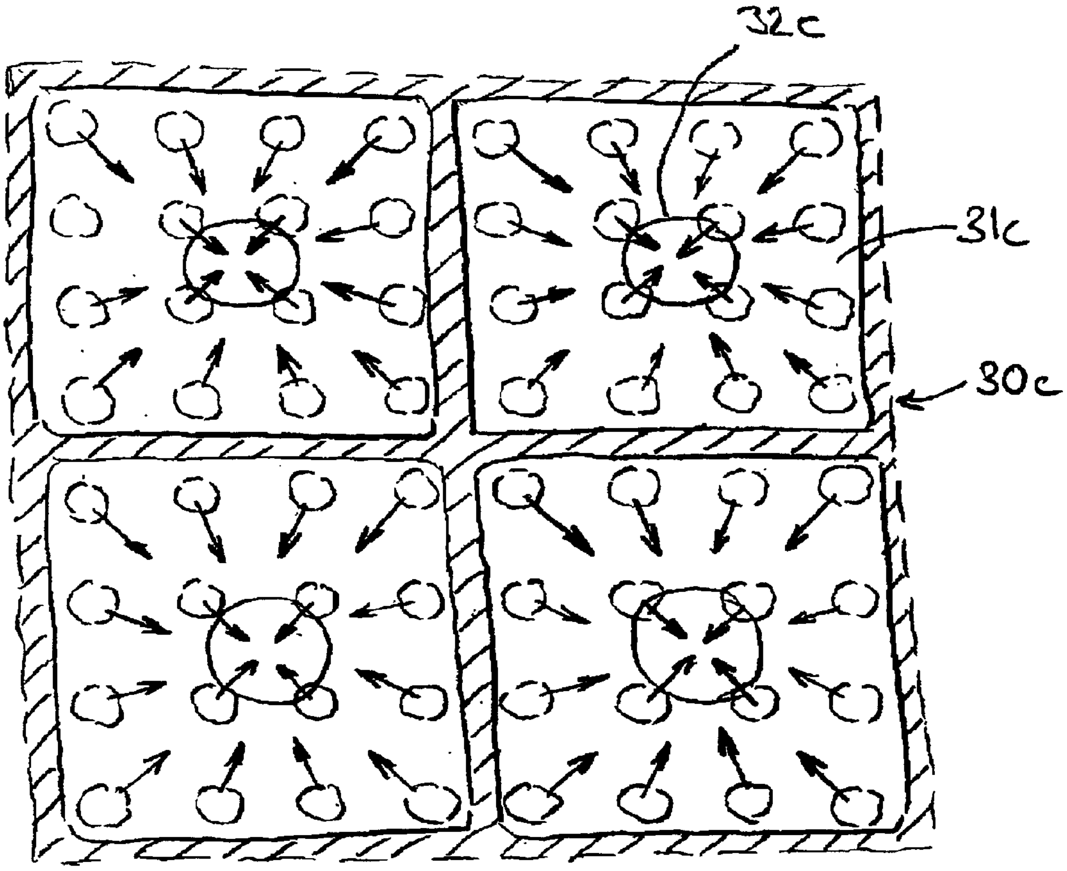

In the adapter 30*c* in FIG. 21, a large common channel 31*c* connects sixteen dosage cylinders of the pipetting unit 10, arranged in a quadratic array, to one orifice 32*c* and further to a pipetting tip of a known type. A vertical section of a corresponding pipetting unit is presented in FIGS. 9 and 10.

Figure 22:
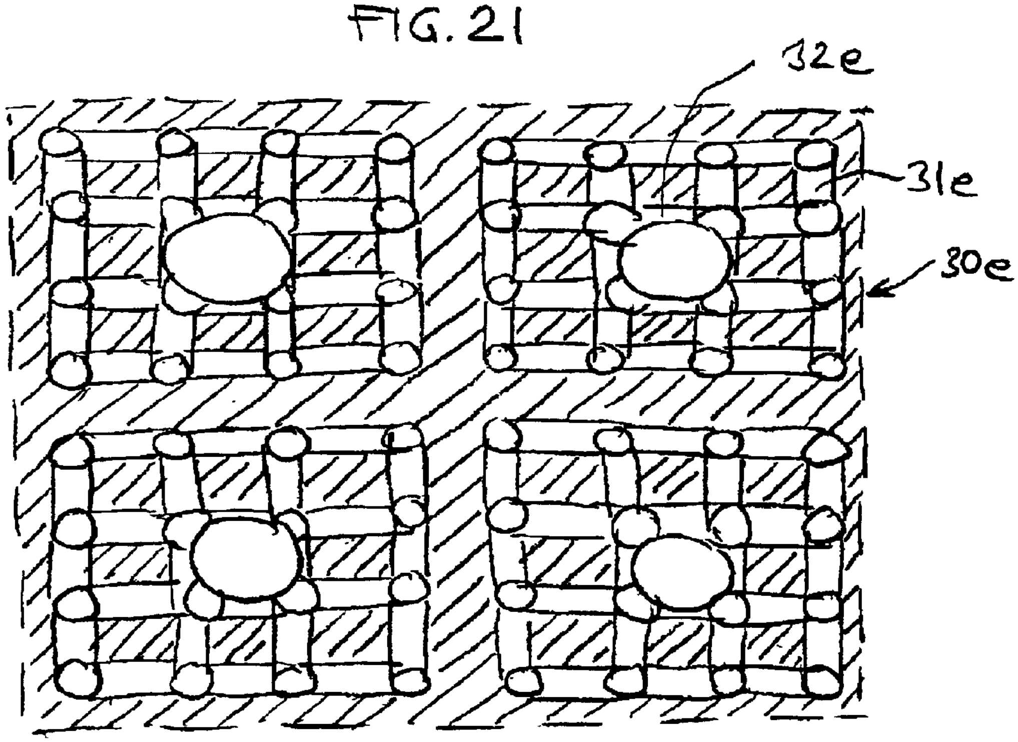

The adapter 30*e* in FIG. 22 contains several small channels 31*e* which also connect sixteen dosage cylinders of the pipetting unit 10 to one orifice 32*e* and further to a pipetting tip of a known type as in the previous figure. However, there is a difference in the structure of the channel system, in which, instead of a single large space, several small channels are connected to the orifice 32*e*. A vertical section of a pipetting unit 10 corresponding to this embodiment is shown in FIGS. 13 and 14.

Figure 23:
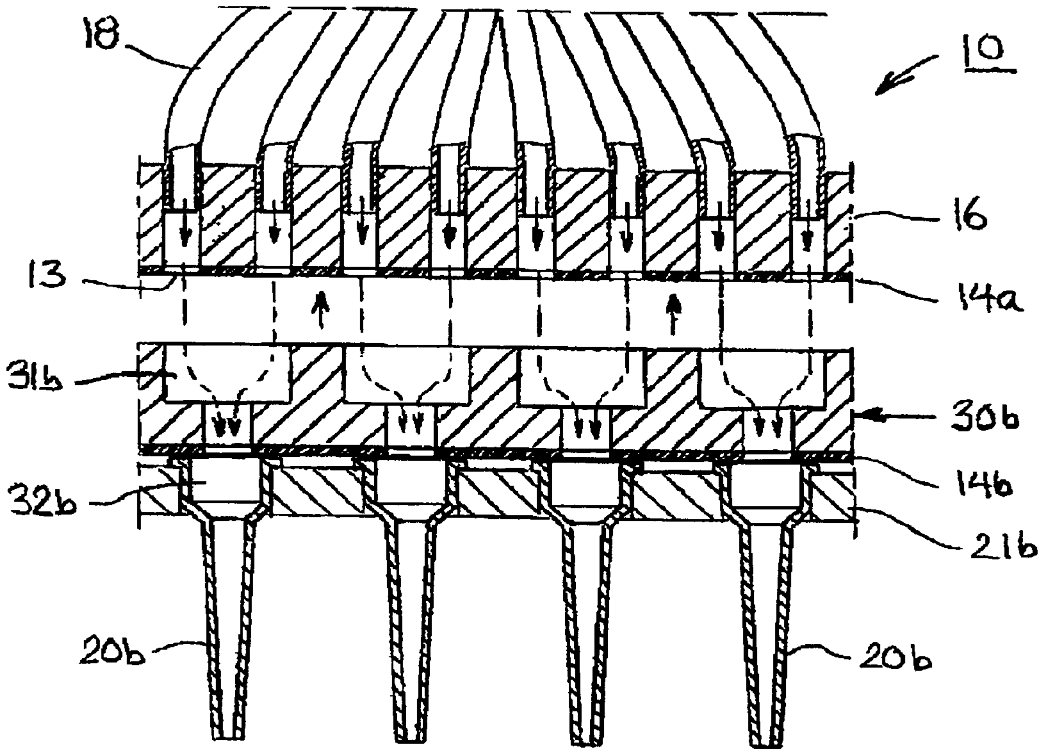

FIG. 23 presents a pipetting unit 10 with an adapter 30*b* like that in FIGS. 7 and 8. However, the frame 16 of the pipetting unit 10 differs in that the dosage cylinders are located at a distance from the adapter 30*b*. The dosage cylinders, which are not shown in FIG. 23, are connected via tubes 18 to the dosage orifices 13 of the frame 16.

Figure 24:
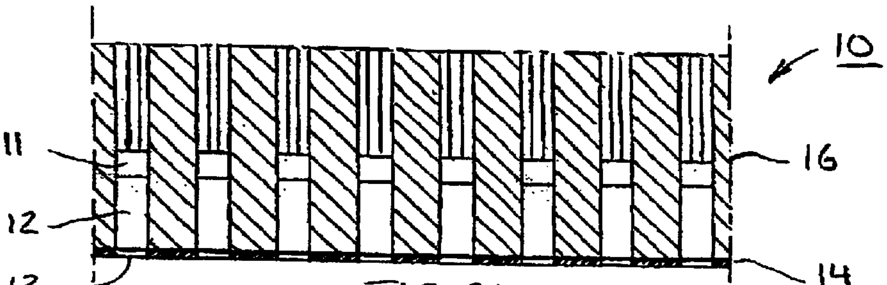
Figure 24A:
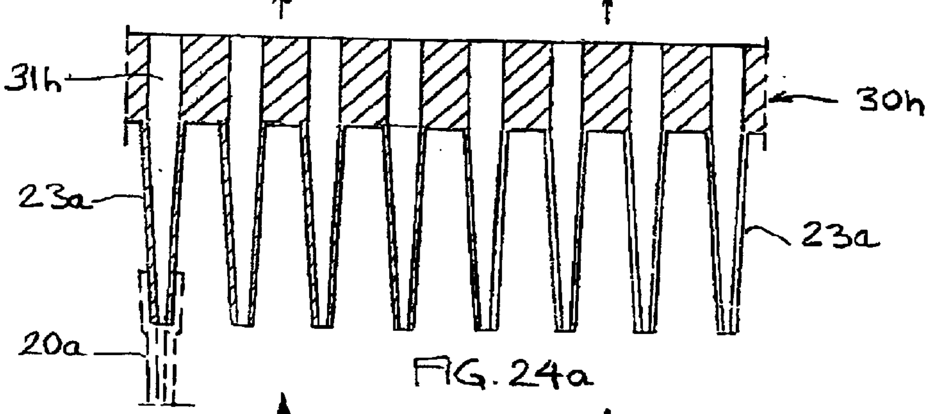
Figure 24B:
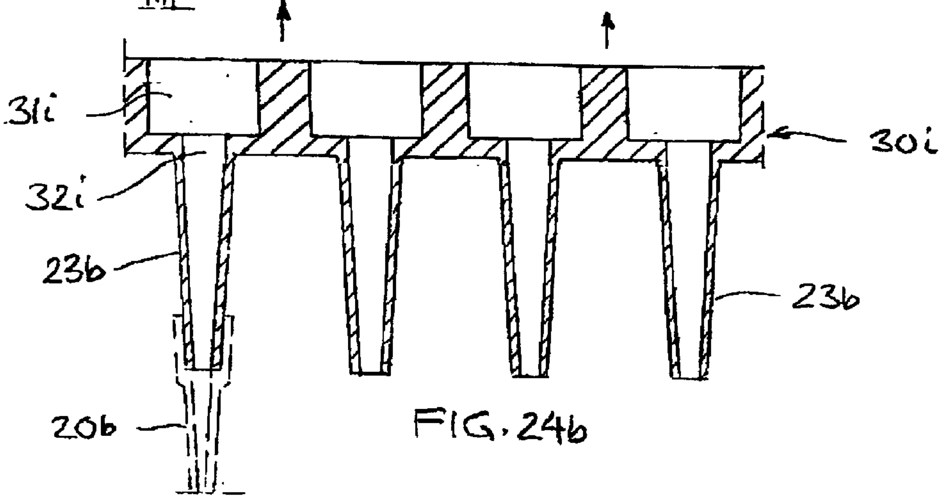
Figure 24C:
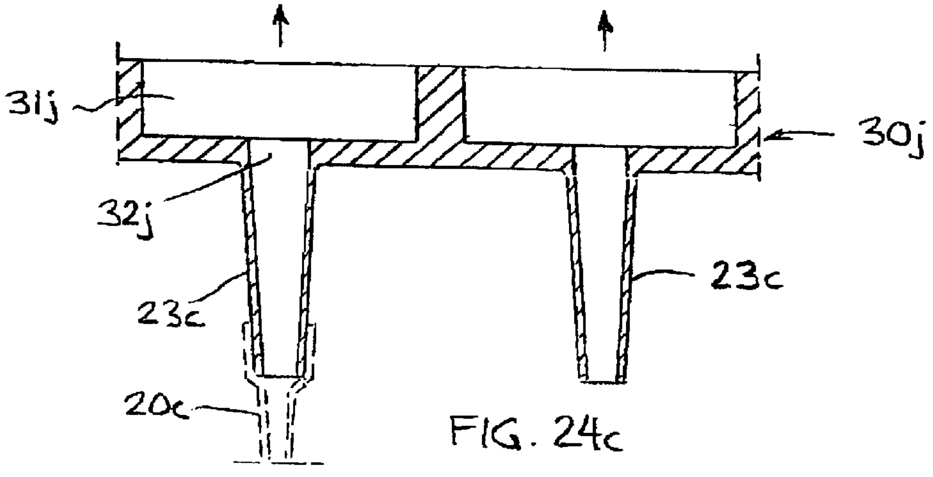

FIG. 24 presents a pipetting unit 10 to whose frame 16 it is possible to alternatively connect one of three different adapters 30 provided with fixed pipetting tips 23 or with separate pipetting tips 20*a* placed over them. The adapter 30*h* in FIG. 24*a* has one fixed pipetting tip for each dosage cylinder 12 of the pipetting unit 10. The adapter 30*i* in FIG. 24*b* again has one fixed pipetting tip 23I or a separate pipetting tip 20*b* placed over it for four dosage cylinders 12 of the pipetting unit 10. The adapter 30*j* in FIG. 24*c* again has one fixed pipetting tip 23*j* or a separate pipetting tip 20*c* placed over it for sixteen dosage cylinders 12 of the pipetting unit 10. In the embodiments presented in FIG. 24, fixed pipetting tips 23 can be used, e.g., when the apparatus is mainly used for only dosing a liquid. To transfer a liquid from a sample plate to another by pipetting, it is generally necessary to use replaceable separate tips 20.

Figure 25:
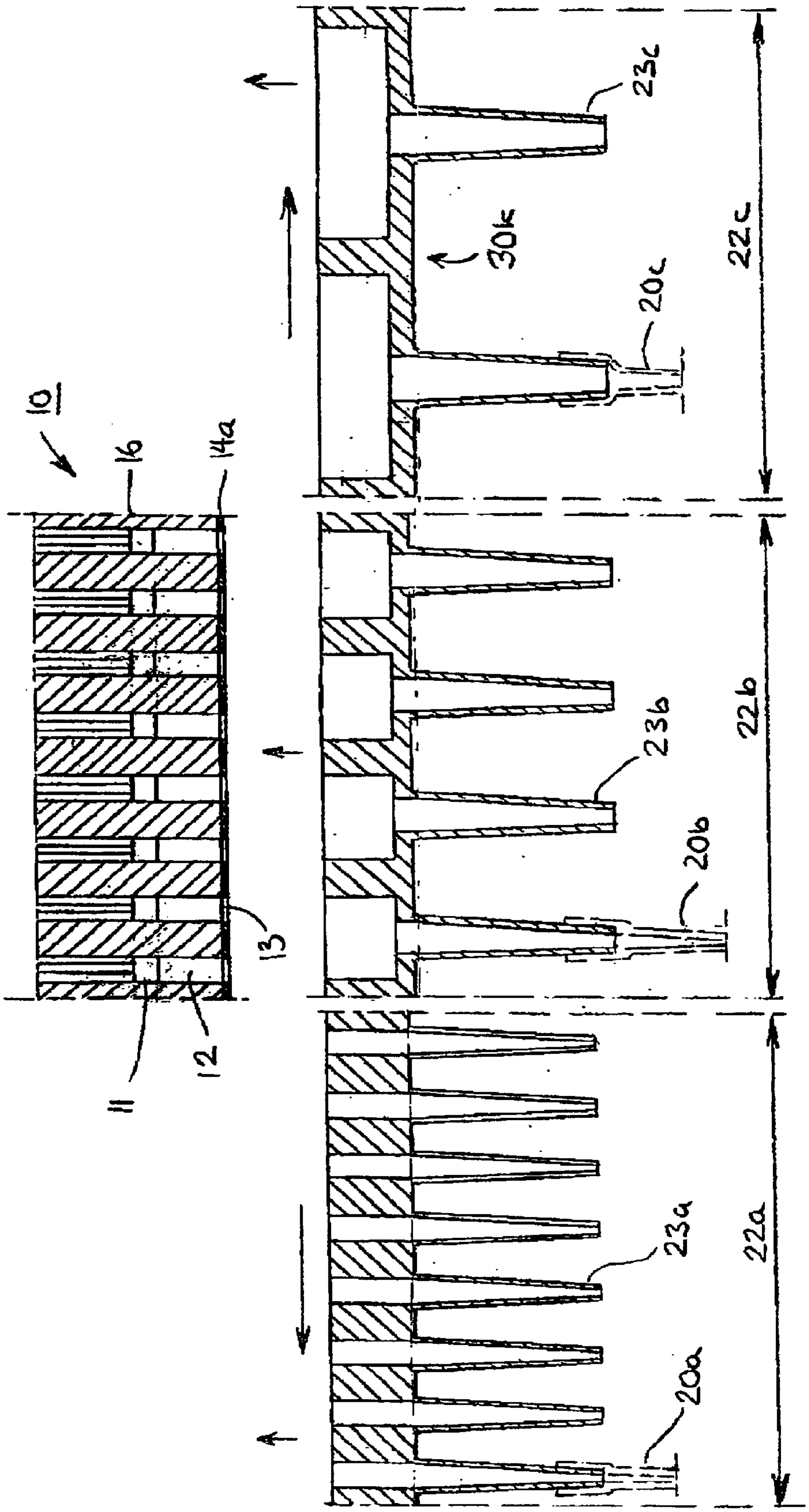

FIG. 25 presents a pipetting unit 10 in which the frame 16 is connected to a laterally movable adapter 30*k* provided with different fixed pipetting tips 23 or with separate pipetting tips 20 placed over them. The adapter 30*k* can be moved laterally so that either zone 22*a*, 22*b* or 22*c* of the adapter 30*k* comes to the position directly opposite to the dosage orifices 13 of the dosage cylinders.

In zone 22*a* of the adapter 30*k*, each dosage cylinder dosage orifice 13 is aligned with a channel 31*h* which leads to a fixed pipetting tip 23*a* or a separate pipetting tip 20*a* placed over it, likewise aligned with the orifice.

In zone 22*b* of the adapter 30*k*, there is a connecting channel 31*i*, an orifice 32*i* and a fixed pipetting tip 23*b* or a separate pipetting tip 20*b* placed over it for four dosage cylinders 12 of the pipetting unit 10. Zone 22*c* of the adapter 30*k* again has a connecting channel 31*j*, an orifice 32*j* and a fixed pipetting tip 23*c* or a separate pipetting tip 20*c* placed over it for sixteen dosage cylinders 12 of the pipetting unit 10.

The pipetting process can be varied depending on the type of micro-sample plate under pipetting simply by moving one of the zones 22*a*, 22*b* or 22*c* of the adapter 30*k* to the position directly opposite to the dosage orifices 13 of the dosage cylinders of the pipetting unit 10. As described above, the pipetting tips in this embodiment are fixedly joined to the adapter 30*k*. Alternatively, it is naturally also possible to use separate, preferably standard-type pipetting tips either in addition to the fixed pipetting tips 23, e.g., by placing them over these, or instead of these. When separate pipetting tips 20 are used, the apparatus can also be so implemented that either the measuring head of the pipetting unit 10 or the movable adapter 30*k* fetches new pipetting tips when necessary.

Using the pipetting unit 10 in FIG. 25, the pipetting of the sample wells of a sample plate can be carried out by selecting from the adapter 30*k* pipetting tips 20 or 23 of the most suitable size for each pipetting situation. Thus, using this pipetting apparatus, large sample wells can be pipetted using large pipetting tips, and when smaller sample wells need to be pipetted, smaller pipetting tips are applied as necessary. Since all the required pipetting tips of different sizes are present in the pipetting apparatus all the time, the apparatus works very efficiently and fast as compared with prior-art apparatuses and methods.

Figure 26:
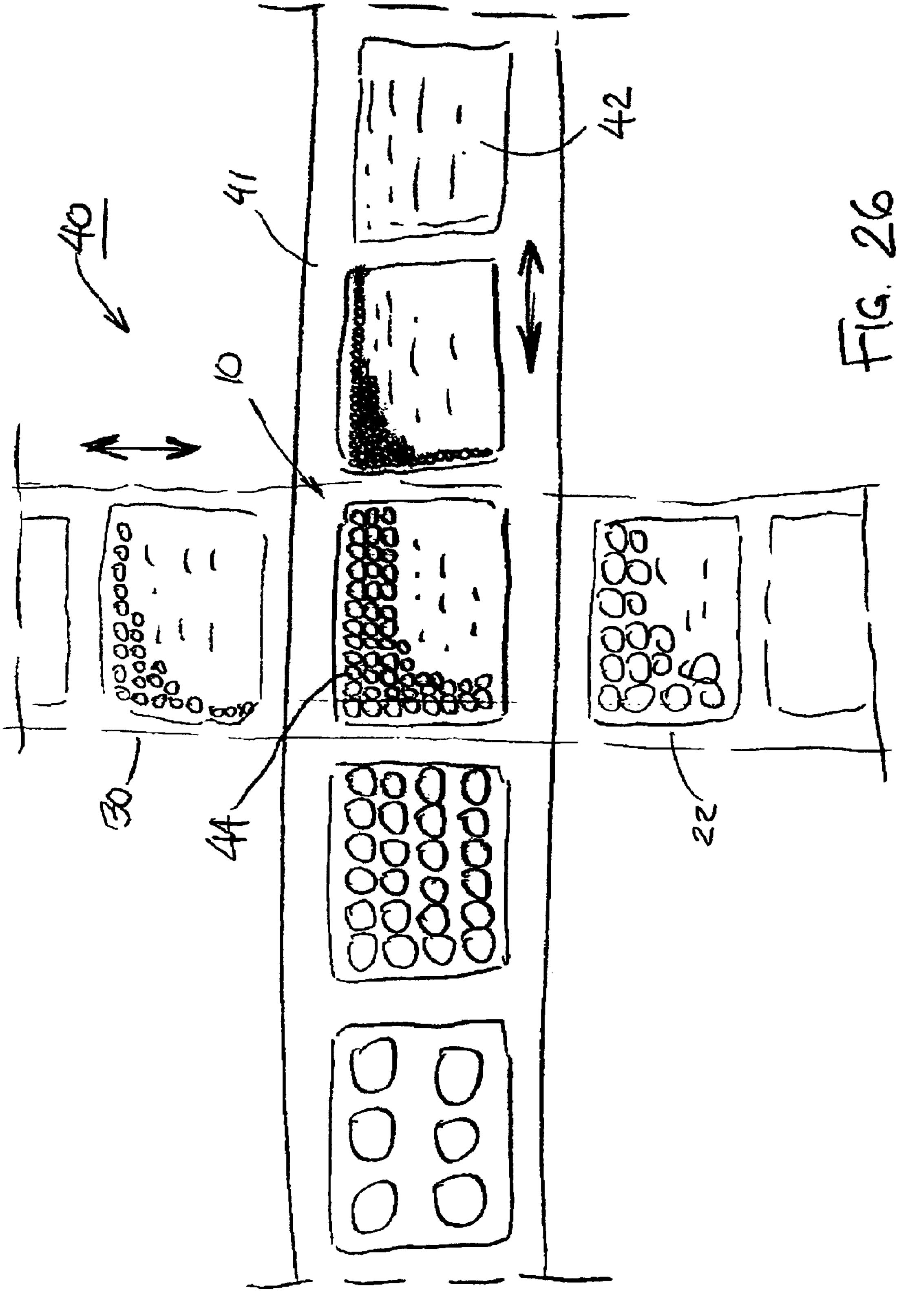

FIG. 26 presents a diagrammatic top view of a pipetting apparatus 40 according to the invention. The pipetting apparatus 40 comprises a pipetting unit 10 and a track 41 for feeding and moving micro-sample plates 42 in lateral directions to bring them to a position directly opposite to the pipetting unit 10. The pipetting unit 10 also comprises an adapter 30 which can be moved laterally but also perpendicularly to the movement of the track 41 and which contains several pipetting tip groups 22 consisting of pipetting tips of different sizes. The adapter 30 is moved laterally so as to bring a desired pipetting tip group 22 to the active position directly opposite to the pipetting unit 10. The pipetting tip group 22 is selected by the type of the micro-sample plate 42 brought on the track 41 to the position opposite to the pipetting unit 10 and by the number of sample wells 44 in the sample plate.

As the track 41 of the micro-sample plates 42 and the movements of the adapter 30 of the pipetting unit 10 are independent from each other, these movements can be controlled so as to bring any one of the pipetting tip groups and micro-sample plates to the pipetting unit 10 for pipetting. In other words, all possible combinations are feasible. The essential point about the apparatus is not whether the pipetting tips are fixedly or detachably mounted in the adapter 30. In practice, naturally the most advantageous alternative is to use separate standard-type pipetting tips. In the apparatus in FIG. 26, it is also possible to use an arrangement whereby the apparatus also fetches new pipetting tips into the adapter 30 as necessary.

Figure 27:
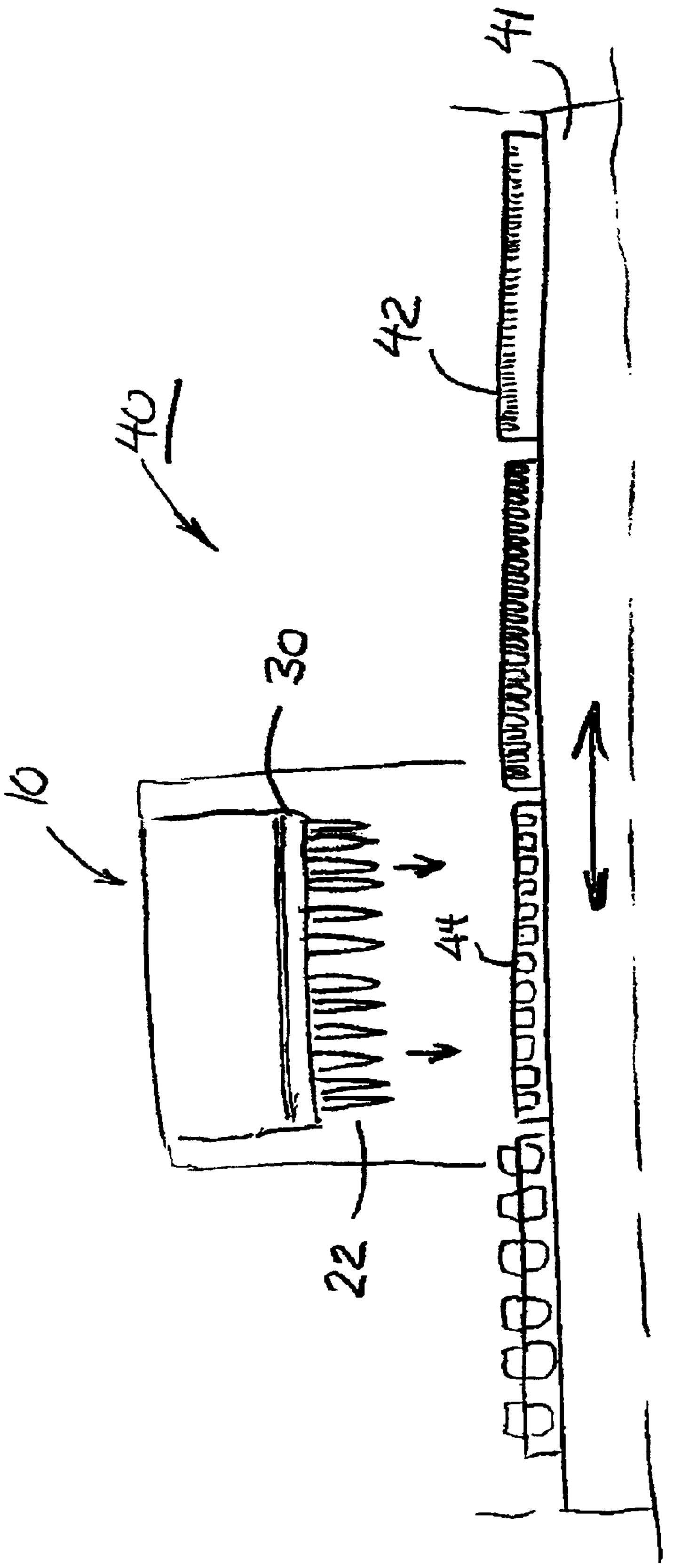

FIG. 27 presents the pipetting apparatus 40 of FIG. 26 in side view. The figure shows a pipetting unit 10 and an adapter 30 and below them a track 41 for feeding and moving micro-sample plates 42 laterally to the position opposite to the pipetting unit 10. The adapter 30 moves in a direction perpendicular to the movement of the track 41, i.e. in a direction away from the plane of the drawing.

Figure 28:
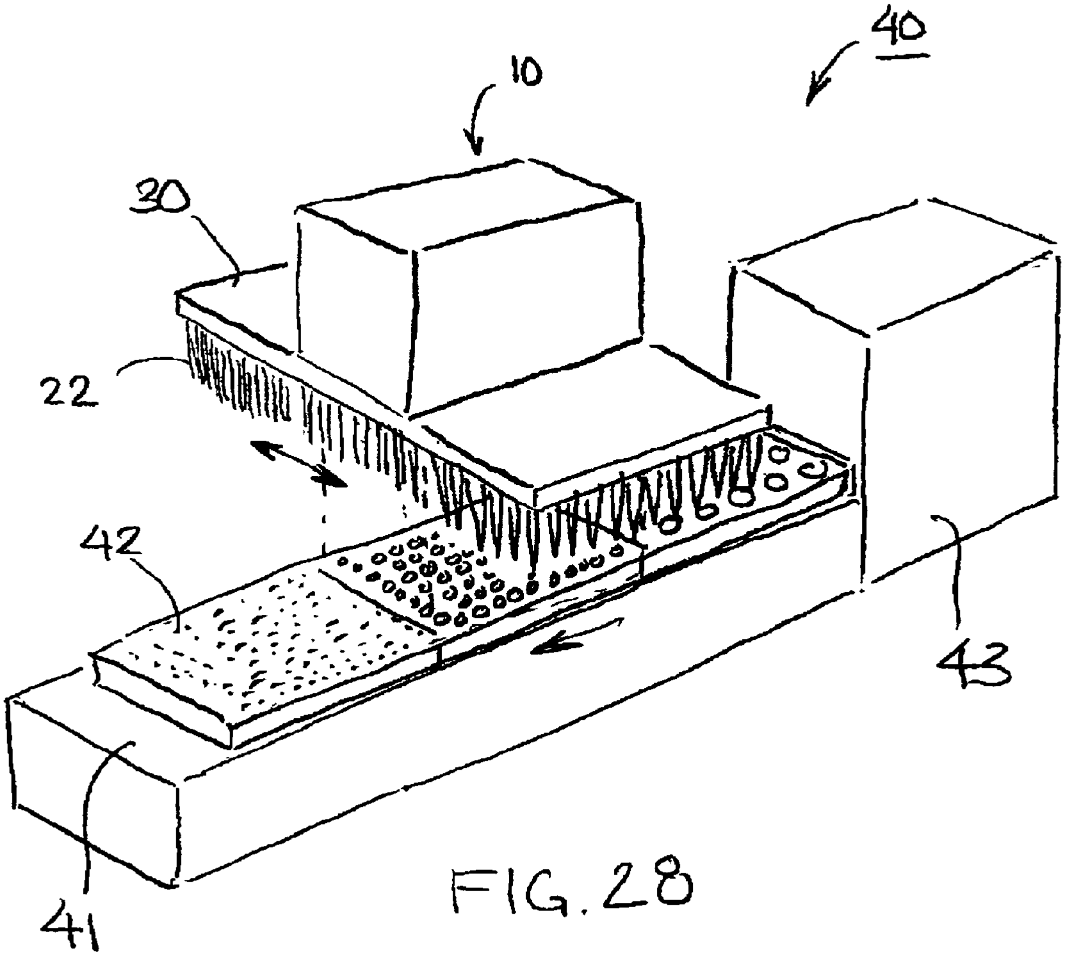

FIG. 28 presents a pipetting apparatus 40 which is a simplified version of the apparatus presented in FIGS. 26 and 27, and in which the micro-sample plates 42 are fed onto the track 41 from a feed device 43. The pipetting unit 10 above the track 41 is provided with a movable adapter 30 with three replaceable pipetting tip groups 22. The pipetting unit 10 can fetch a new group to replace a pipetting tip group 22 when necessary. The pipetting tips may be fixed or separate tips.

Figure 29:
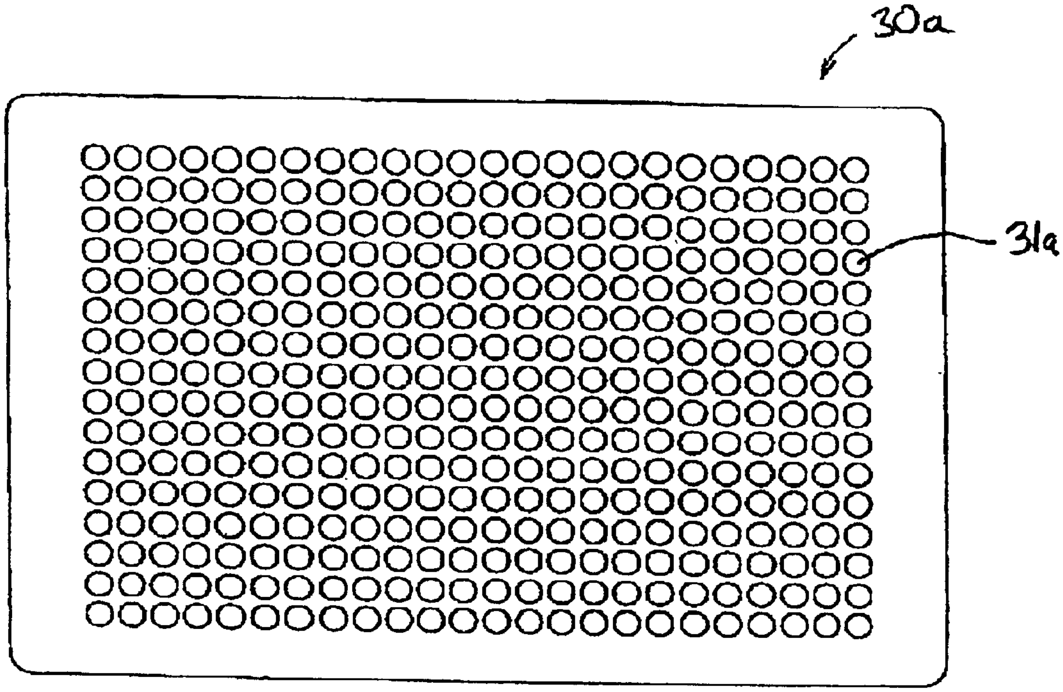

FIG. 29 presents a more detailed view of a replaceable adapter 30*a* containing 384 channels 31*a*. It is intended for pipetting a known micro-sample plate containing 384 sample wells, in which the sample wells are arranged in the same order as the channels 31*a* in the adapter 30*a*. The dosage cylinders above the adapter 30*a* are also spaced at the same distances between them as the channels 31*a* of the adapter 30*a* and the pipetting tips and sample wells of the micro-sample plate below them. Thus, each dosage cylinder is connected via one channel 31*a* of the adapter 30*a* to one pipetting tip aligned with the sample well.

Figure 30:
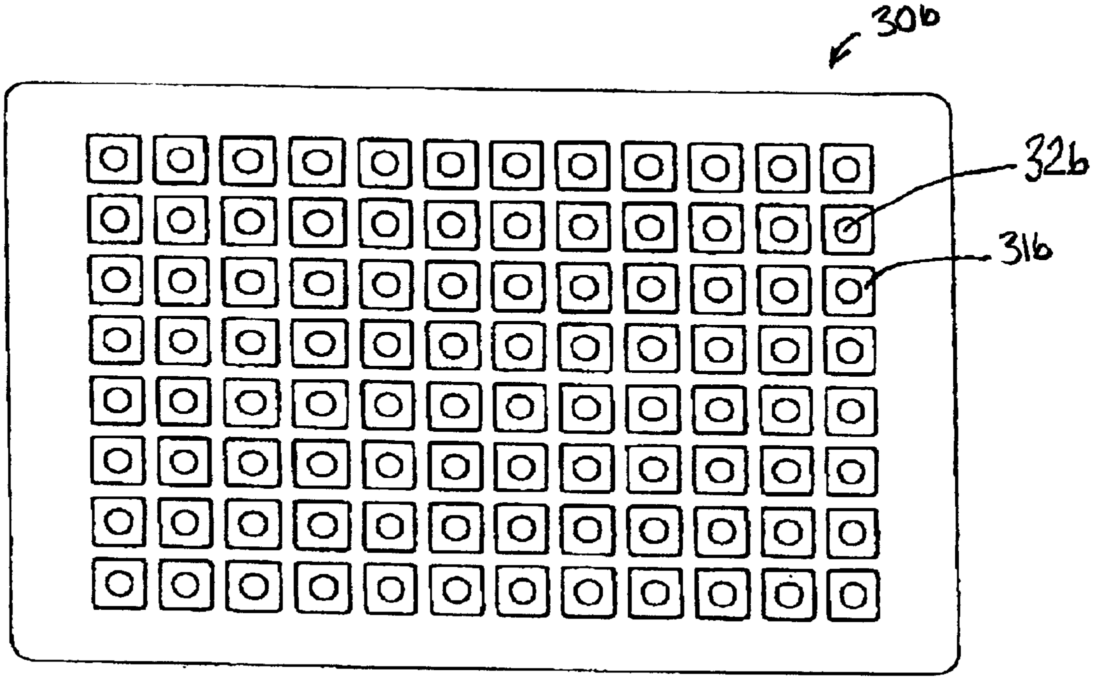

FIG. 30 also shows a more detailed view of another replaceable adapter 30*b* of the pipetting unit 10, containing 96 connecting channels 31 *b* of another type. If the adapter 30*a* in the pipetting unit in FIG. 29 is replaced with this adapter 31*b*, then each connecting channel 31*b* connects four dosage cylinders of the pipetting unit via an orifice 32 to one larger, standard-type pipetting tip. In this case, the distance between these larger pipetting tips corresponds to the distance between the sample wells of a micro-sample plate containing 96 sample wells.

Figure 31:
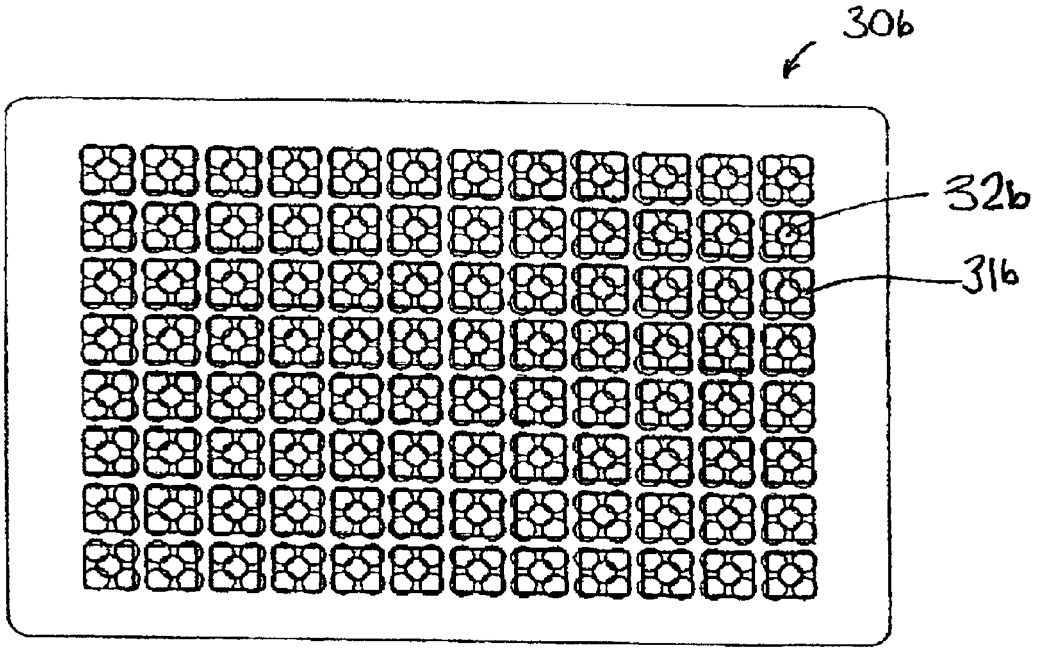

FIG. 31 shows in a diagrammatic form how a replaceable adapter 30*b* of the pipetting unit 10 as presented in FIG. 30 connects four dosage cylinder dosage orifices to one dosage orifice 32*b* in the adapter 30, which again can be connected to a standard-type pipetting tip. In each group of four dosage orifices, the orifice 32*b* to the pipetting tip is placed in the middle of the group. By means of this adapter 30*b*, using a pipetting unit containing 384 dosage cylinders, a micro-sample plate containing 96 sample wells can be pipetted. Again, by replacing the adapter in the pipetting unit with an adapter 30*a* as presented in FIG. 29, a micro-sample plate containing 384 sample wells can be pipetted.

Figure 32:
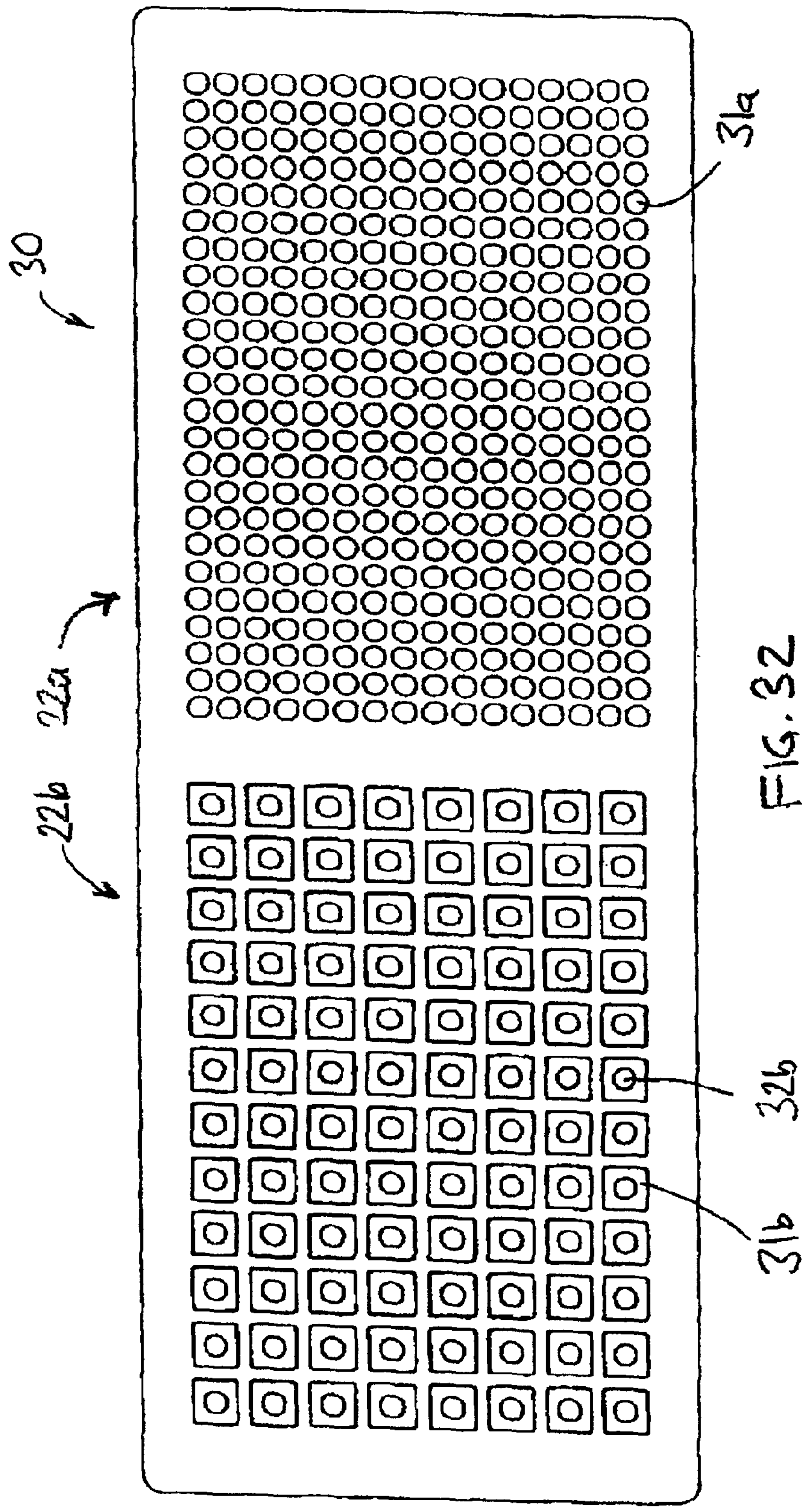

FIG. 32 presents an example of the laterally movable adapter 30 of the pipetting unit 10. This adapter 30 comprises two zones 22*a* and 22*b*, of which the first zone 22*a* contains only direct channels 31*a* while the second zone 22*b* contains only channels 31*b* connecting four dosage cylinder dosage orifices to one orifice 32*b*. The adapter 30 in FIG. 32 may alternatively be formed by disposing the zones 22*a* and 22*b* with their longer sides contiguous to each other. In principle, the adapter 30 may also comprise any number of zones 22 combined in any order.

Figure 33:
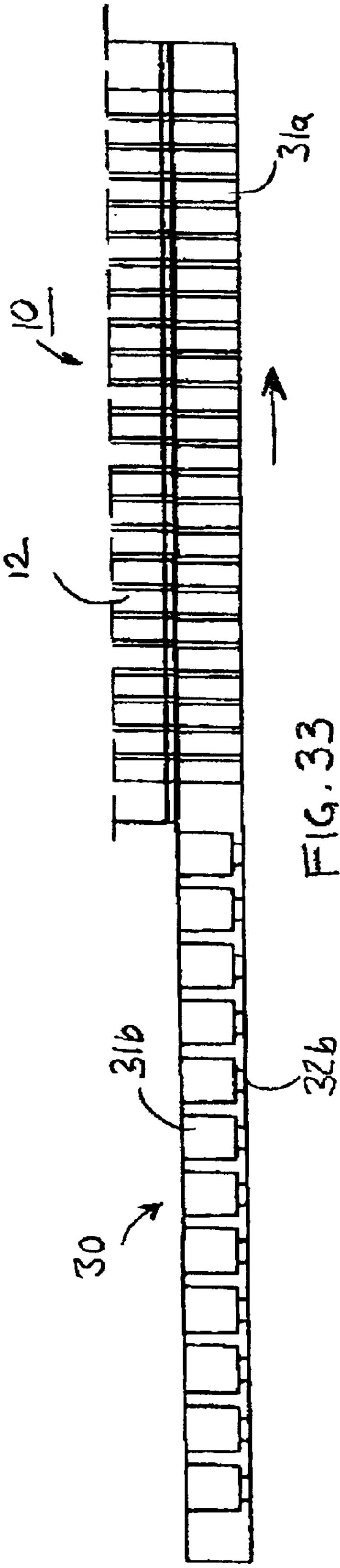

FIG. 33 presents as an example a lateral view of a pipetting unit 10 provided with a laterally movable adapter 30 as shown in FIG. 32. In FIG. 33, the adapter 30 is in a position such that the dosage orifices of the dosage cylinders 12 are aligned with the direct channels 31*a*.

Figure 34:
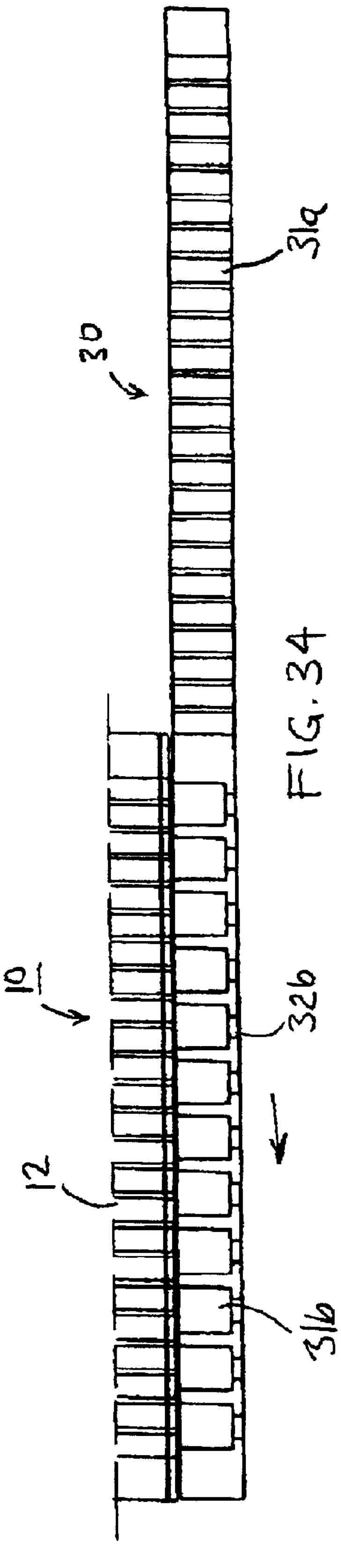

In FIG. 34 again, the laterally movable adapter 30 of the pipetting unit 10 is in a position such that the dosage orifices of the dosage cylinders 12 are aligned with the channels 31*b* connecting four dosage cylinder dosage orifices.

Additional Remarks

It is obvious to the person skilled in the art that different embodiments of the invention may be varied within the scope of the claims presented below.

What is claimed is:

1. Multichannel pipetting apparatus (40) for simultaneously aspirating samples from or dispensing samples to a plurality of sample wells (44) or containers, said pipetting apparatus comprising a pipetting unit (10) comprising a number of pipetting channels (12), a number of pipetting tips (20), at least one orifice (32), wherein the pipetting channels (12) are adapted to be divided into groups, at least some of which comprise two or more pipetting channels, and each pipetting tip (20) of the pipetting unit (10) is connected to a corresponding group of pipetting channels (12) so that each pipetting tip communicates with all the pipetting channels in said corresponding group, wherein the pipetting unit (10) of the pipetting apparatus (40) further comprises at least one adapter (30), which divides the pipetting channels into groups, said adapter (30) placed between the pipetting channels (12) and the pipetting tips (20) and containing a number of connecting channels (31) or connecting channel groups connecting the groups of pipetting channels to the pipetting tips, wherein each connecting channel (31) or connecting channel group in the adapter (30) is connected to one of said groups of pipetting channels (12) and one of said pipetting tips (20), via an orifice (32).

2. The pipetting apparatus (40) as defined in claim 1, wherein the pipetting unit (10) comprises at least two different adapters (30) which can be alternately placed in the pipetting unit, between the pipetting channels (12) and the pipetting tips (20), the adapters (30) contain different connecting channels (31) or connecting channel groups, wherein the connecting channels (31) or connecting channel groups in different adapters (30) differ from each other in that a different number of pipetting channels (12) can be connected via the connecting channels (31) or connecting channel groups to each pipetting tip (20).

3. The pipetting (40) as defined in claim 1, wherein the pipetting unit (10) comprises an adapter (30) comprising at least two different zones (22) containing different connecting channels (31) or connecting channel groups, the connecting channels (31) or connecting channel groups located in the different zones (22) of the adapter (30) differ from each other in that a different number of pipetting channels (12) can be connected via the connecting channels (31) to each pipetting tip (20), and wherein the adapter (30) can be displaced or moved so as to bring the different zones (22) alternately into connection with the pipetting channels (12).

4. The pipetting (40) as defined in claim 1, 2, or 3 wherein the pipetting apparatus (40) comprises a track (41) for moving micro-sample plates (42) laterally to a position directly opposite to the pipetting unit (10), wherein the pipetting unit (10) contains one or more adapters (30) which can be moved above the track (41) in a direction perpendicular to the direction of movement of the track, and wherein said one or more adapters contain two or more different zones (22) containing connecting channels (31) or connecting channel groups which connect a different number of pipetting channels (12) to each pipetting tip (20).

5. The pipetting (40) as defined in claim 1, wherein the adapter (30) is provided with a plurality of pipetting tips (20) or pipetting tip connecting elements (15*b, d, e, f, g*) fixedly attached thereto.

6. The pipetting (40) as defined in claim 1, wherein the pipetting unit further comprises a frame (16) which contains a lower surface (17) and wherein the connecting channels (31) or connecting channel groups of the adapter (30) are fitted against a seal (14*a*) on the lower surface (17) of the frame (16) of the pipetting unit (10) or onto a plurality of connecting elements (15*a*) of said pipetting channels (12), wherein said connecting elements (15*a*) extend from the lower surface of the frame.

7. The pipetting (40) as defined in 6, wherein the adapter further comprises a lower surface and wherein the pipetting tips (20) are fitted against a seal (14*b*) on the lower surface of the adapter (30) or onto a plurality of connecting elements (15*b, d, e, f, g*) of said at least one orifice (32), wherein said connecting elements (15*b, d, e, f, g*) extend from the lower surface of the adapter.

* * * * *